(12) United States Patent
Nakayama et al.

(10) Patent No.: US 8,080,915 B2
(45) Date of Patent: Dec. 20, 2011

(54) EMBEDDED MAGNET MOTOR AND MANUFACTURING METHOD OF THE SAME

(75) Inventors: Takahiro Nakayama, Hamamatsu (JP); Hirotaka Itoh, Kosai (JP); Yoshiyuki Takabe, Hamamatsu (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 12/962,292

(22) Filed: Dec. 7, 2010

(65) Prior Publication Data
US 2011/0115328 A1 May 19, 2011

Related U.S. Application Data

(62) Division of application No. 12/861,311, filed on Aug. 23, 2010, now Pat. No. 7,868,503, which is a division of application No. 12/277,572, filed on Nov. 25, 2008, now Pat. No. 7,800,272.

(30) Foreign Application Priority Data

| Nov. 28, 2007 | (JP) | 2007-307368 |
| Nov. 28, 2007 | (JP) | 2007-307369 |
| Nov. 28, 2007 | (JP) | 2007-307370 |
| Mar. 26, 2008 | (JP) | 2008-081412 |
| Apr. 3, 2008 | (JP) | 2008-097195 |
| Apr. 17, 2008 | (JP) | 2008-108006 |
| Jun. 30, 2008 | (JP) | 2008-170266 |
| Nov. 7, 2008 | (JP) | 2008-286866 |

(51) Int. Cl.
*H02K 1/27* (2006.01)

(52) U.S. Cl. ......... 310/156.56; 310/156.38; 310/156.43; 310/156.57; 310/68 B

(58) Field of Classification Search ......... 310/156.38–156.57, 216.004, 310/216.127–216.133, 68 B
See application file for complete search history.

(56) References Cited

U.S. PATENT DOCUMENTS

| 3,840,763 | A | * | 10/1974 | Baumann et al. | 310/156.56 |
| 5,508,576 | A | * | 4/1996 | Nagate et al. | 310/156.54 |
| 5,811,904 | A | * | 9/1998 | Tajima et al. | 310/156.45 |
| 5,864,192 | A | * | 1/1999 | Nagate et al. | 310/156.05 |
| 6,031,311 | A | * | 2/2000 | Lee | 310/156.57 |
| 6,917,133 | B2 | | 7/2005 | Koharagi et al. | |
| 7,365,466 | B2 | | 4/2008 | Weihrauch et al. | |
| 7,705,504 | B2 | * | 4/2010 | Nakayama et al. | 310/156.57 |
| 7,732,965 | B2 | * | 6/2010 | Nakayama et al. | 310/156.57 |
| 7,750,523 | B2 | * | 7/2010 | Nakayama et al. | 310/156.53 |
| 7,800,272 | B2 | * | 9/2010 | Nakayama et al. | 310/156.56 |
| 7,868,503 | B1 | * | 1/2011 | Nakayama et al. | 310/156.56 |

FOREIGN PATENT DOCUMENTS

| JP | 58136258 | | 8/1983 |
| JP | 58136258 | A * | 8/1983 |
| JP | 61052146 | A * | 3/1986 |
| JP | 08256441 | | 10/1996 |
| JP | 08256441 | A * | 10/1996 |
| JP | 2007195391 | | 8/2007 |

* cited by examiner

*Primary Examiner* — Tran Nguyen

(74) *Attorney, Agent, or Firm* — Caesar, Rivise, Bernstein, Cohen & Pokotilow, Ltd.

(57) ABSTRACT

In an embedded magnet motor, radial magnets and first inclined magnets form north poles. The radial magnets and second inclined magnets form south poles. Core sheets each include preformed radial accommodating slots the number of which is expressed by P/2. Some of the preformed radial accommodating slots are short slots and the rest are long slots. The short slots are located at some parts of each radial accommodating slot along the axial direction. Radially inner ends of the short slots restrict the radial magnets from moving radially inward.

3 Claims, 31 Drawing Sheets

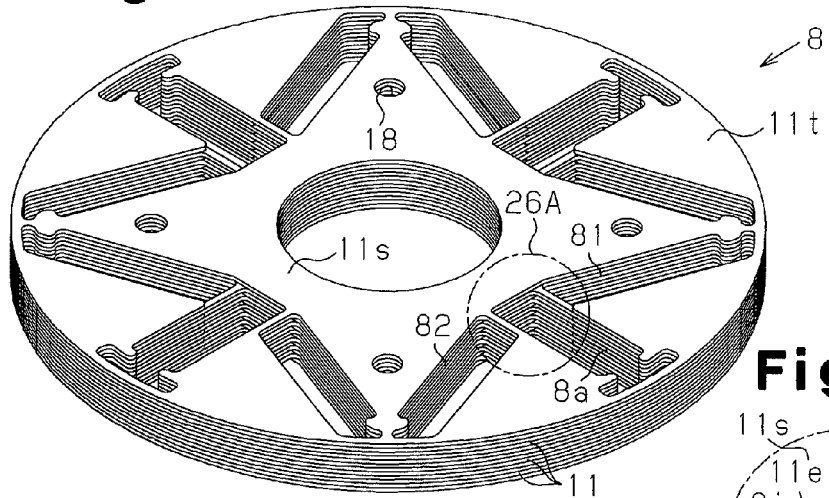
Fig.26
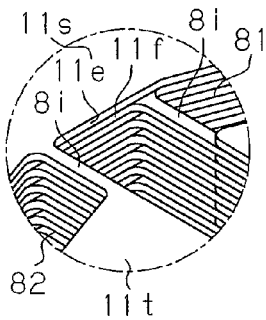
Fig.26A
Fig.27
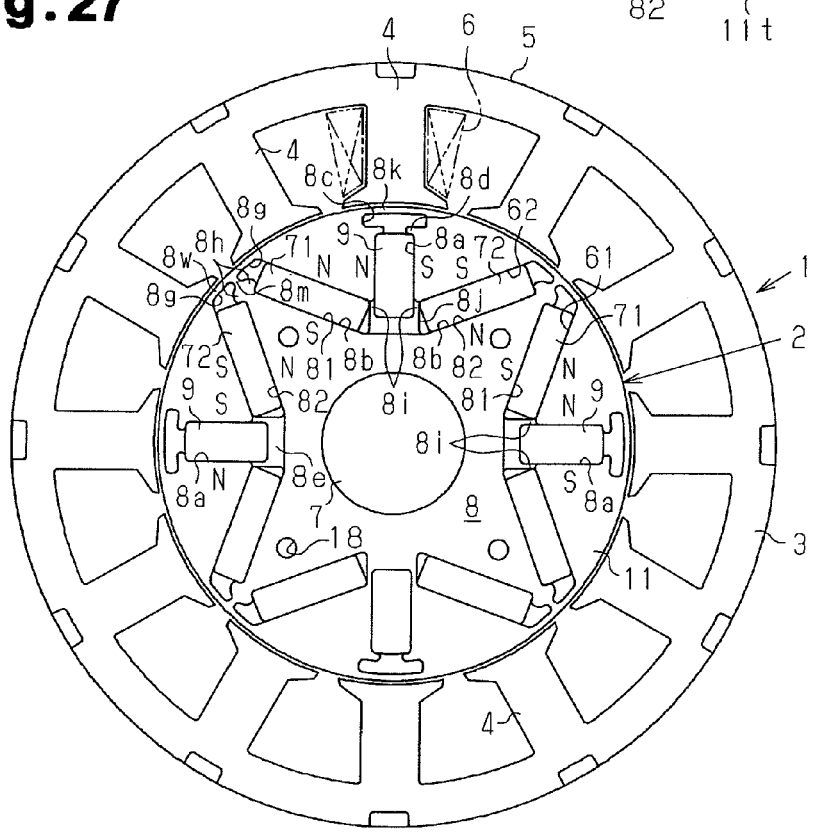

EMBEDDED MAGNET MOTOR AND MANUFACTURING METHOD OF THE SAME

CROSS REFERENCE TO RELATED APPLICATIONS

This divisional application claims the benefit under 35 U.S.C. §121 of application Ser. No. 12/861,311 filed on Aug. 23, 2010 now U.S. Pat. No. 7,868,503 which in turn claims the benefit under 35 U.S.C. §121 of application Ser. No. 12/277,572 filed on Nov. 25, 2008 (now U.S. Pat. No. 7,800, 272) and all of whose entire disclosures are incorporated by reference herein, and which in turn takes its priority from the following Japanese applications: JP 2008-286866 filed Nov. 7, 2008; JP 2008-170266 filed Jun. 30, 2008; JP 2008-108006 filed Apr. 17, 2008; JP 2008-097195 filed Apr. 3, 2008; JP 2008-081412 filed Mar. 26, 2008; JP 2007-307368; JP 2007-307369; and JP 2007-307370 all of which were filed Nov. 28, 2007.

BACKGROUND OF THE INVENTION

The present invention relates to an embedded magnet motor and a manufacturing method of the same.

A rotor core of an embedded magnet motor disclosed in Japanese Laid-Open Patent Publication No. 2007-195391 includes radial accommodating slots the number of which is expressed by P/2, first inclined accommodating slots the number of which is expressed by P/2, and second inclined accommodating slots the number of which is expressed by P/2. The radial accommodating slots extend in a substantially radial direction of the rotor core as viewed from the axial direction. A pair of each first inclined accommodating slot and the associated second inclined accommodating slot form a V-shaped accommodating slot. Each of the radial accommodating slots accommodates a radial magnet. Each of the first inclined accommodating slots accommodates a first inclined magnet. Each of the second inclined accommodating slots accommodates a second inclined magnet. Each of the radial magnets and the adjacent first inclined magnet form a north pole. Each of the radial magnets and the adjacent second inclined magnet form a south pole. As a result, north poles the number of which is expressed by P/2 and south poles the number of which is expressed by P/2 are formed.

Radially inner ends of the radial magnets of the above publication are surrounded by walls of the radially inner ends of the radial accommodating slots without any spaces.

SUMMARY OF THE INVENTION

Accordingly, it is an objective of the present invention to provide a new embedded magnet motor and a manufacturing method of the same.

One aspect of the present invention provides an embedded magnet motor including a rotor. An axis of the rotor is referred to as a rotor axis. The rotor includes a rotor core, radial magnets the number of which is expressed by P/2, first inclined magnets the number of which is expressed by P/2, and second inclined magnets the number of which is expressed by P/2. The rotor core includes radial accommodating slots the number of which is expressed by P/2, first inclined accommodating slots the number of which is expressed by P/2, and second inclined accommodating slots the number of which is expressed by P/2. The radial accommodating slots, the first inclined accommodating slots, and the second inclined accommodating slots extend entirely through the rotor core in the axial direction. The radial accommodating slots extend substantially in a radial direction of the rotor core. The first inclined accommodating slots and the second inclined accommodating slots extend linearly to be inclined with respect to the radial accommodating slots. A pair of each first inclined accommodating slot and the associated second inclined accommodating slot form a V-shaped accommodating slot. The V-shape points radially outward of the rotor core. The radial accommodating slots and the V-shaped accommodating slots being arranged alternately in the circumferential direction of the rotor core. Each of the radial accommodating slots accommodates one of the radial magnets. Each of the first inclined accommodating slots accommodates one of the first inclined magnets. Each of the second inclined accommodating slots accommodates one of the second inclined magnets. Each of the radial magnets is located between one of the first inclined magnets and one of the second inclined magnets. Each radial magnet and the circumferentially adjacent first inclined magnet form one of a north pole and a south pole. Each radial magnet and the circumferentially adjacent second inclined magnet form the other one of the north pole and the south pole. As a result, north poles the number of which is expressed by P/2 and south poles the number of which is expressed by P/2 are formed. That is, the number of magnetic poles of the rotor is expressed by P. The rotor core is formed by laminating a plurality of core sheets in the axial direction. Each core sheet includes preformed radial accommodating slots the number of which is expressed by P/2. The preformed radial accommodating slots are distributed in the circumferential direction of the core sheet. The radial accommodating slots are formed by laminating the preformed radial accommodating slots. Some of the preformed radial accommodating slots are short slots, and the rest are long slots. The distance between a radially inner end of each short slot and the rotor axis is referred to as a first radial distance R1. The distance between a radially inner end of each long slot and the rotor axis is referred to as a second radial distance R2. Setting is performed to satisfy R2<R1. The short slots are located at some parts of each radial accommodating slot along the axial direction. As a result, the radially inner ends of the short slots restrict the radial magnets from moving radially inward.

According to another aspect of the present invention, the radial dimension of the preformed radial accommodating slots is greater than the radial dimension of the radial magnets. Each core sheet includes a projection, which projects at least in one of the preformed radial accommodating slots. A direction perpendicular to the radial direction is referred to as a width direction. Each projection projects from only one of widthwise sides of the preformed radial accommodating slot. The projections are located at least at some parts of each radial accommodating slot along the axial direction. As a result, the projections restrict the radial magnets from moving radially inward.

According to another aspect of the present invention, each core sheet includes preformed radial accommodating slots the number of which is expressed by P/2, first preformed inclined accommodating slots the number of which is expressed by P/2, and second preformed inclined accommodating slots the number of which is expressed by P/2. The preformed radial accommodating slots are distributed in the circumferential direction of the core sheet. The radial accommodating slots are formed by laminating the preformed radial accommodating slots. The first inclined accommodating slots are formed by laminating the first preformed inclined accommodating slots. The second inclined accommodating slots are formed by laminating the second preformed inclined accommodating slots. Some of the preformed radial accommodating slots in each core sheet are both-side communication slots, and the rest are independent slots. The radially inner end of each both-side communication slot communicates with both circumferentially adjacent first preformed inclined accommodating slot and the second preformed inclined accommodating slot. Each independent slot communicates neither with the first preformed inclined accommodating slot nor with the second preformed inclined accommodating slot. An inner bridge is provided between each independent slot and the associated first preformed inclined accommodating slot. Another inner bridge is provided between each independent slot and the associated second preformed inclined accommodating slot. The independent slots are located at some parts of each radial accommodating slot along the axial direction. As a result, the inner bridges restrict the corresponding first inclined magnet and the second inclined magnet from moving radially inward.

According to another aspect of the present invention, some of the preformed radial accommodating slots at least in one of the core sheets are one-side communication slots. Each of the one-side communication slots communicates with one of the first preformed inclined accommodating slot and the second preformed inclined accommodating slot, and does not communicate with the other one. That is, an inner bridge is provided between the other one of the first preformed inclined accommodating slot and the second preformed inclined accommodating slot and the one-side communication slot. The one-side communication slots are located at least at some parts of each radial accommodating slot along the axial direction.

According to another aspect of the present invention, some of the preformed radial accommodating slots at least in one of the core sheets are projecting communication slots. A radially inner end of each projecting communication slot communicates with the circumferentially adjacent first inclined accommodating slot and the second inclined accommodating slot. The radially inner end of the projecting communication slot is provided with a restricting projection, which projects radially outward. The projecting communication slots are located at least at some parts of each radial accommodating slot along the axial direction. As a result, the restricting projections restrict the radial magnets from moving radially inward. The restricting projections restrict the first inclined magnets and the second inclined magnets from moving radially inward, thereby preventing the first inclined magnets and the second inclined magnets from contacting the radial magnets.

According to another aspect of the present invention, a direction perpendicular to the direction in which each radial accommodating slot extends as viewed from the axial direction is referred to as a width direction. A wide slot is provided at a radially outer end of each radial accommodating slot. A second width of the wide slots is greater than a first width of the radial magnets. Each of the radial accommodating slot is provided with a projection formed radially inward than the associated wide slot. The width of part of the radial accommodating slot constricted by the projection is less than the first width of the radial magnet. As a result, the projections restrict the radial magnets from moving radially outward. The radial dimension of the wide slot is referred to as a wide radial dimension Y. The thickness of each core sheet is referred to as a core sheet thickness T. Setting is performed to satisfy $Y \leq 4T$.

According to another aspect of the present invention, an outer bridge is located between the radially outer end of each radial accommodating slot and an outer circumferential surface of the rotor core. The radial dimension of the outer bridge being referred to as AB. A V-slot outer bridge is provided between the radially outer end of each V-shaped accommodating slot and the outer circumferential surface of the rotor core. The radial dimension of the V-slot outer bridge is also AB. A bridge between inclined slots is provided between the radially outer end of each first inclined accommodating slot and the radially outer end of the associated second inclined accommodating slot. The width of the bridge between inclined slots is referred to as an inter-inclined slot bridge dimension BB. Setting is performed to satisfy BB>AB.

According to another aspect of the present invention, an inner bridge is located between the radially inner end of each radial accommodating slot and the radially inner end of the associated first inclined accommodating slot. Another inner bridge is provided between the radially inner end of each radial accommodating slot and the radially inner end of the associated second inclined accommodating slot. The width of the inner bridges is referred to as an inner bridge dimension CB. A bridge between inclined slots is provided between the radially outer end of each first inclined accommodating slot and the radially outer end of the associated second inclined accommodating slot. The width of the bridge between inclined slots is referred to as an inter-inclined slot bridge dimension BB. Setting is performed to satisfy BB>CB.

According to another aspect of the present invention, the embedded magnet motor includes a magnetic sensor. The magnetic sensor detects rotation of the rotor by detecting axial magnetic flux leakage from the rotor. The magnetic sensor is arranged in a radially outer region to face an axial end surface of the rotor. The magnetic sensor in the radially outer region detects the magnetic flux. Positive and negative poles of the magnetic flux are reversed only once in one cycle of magnetic flux variation during a period when the rotor is rotated and the magnetic sensor passes between the first inclined magnet and the second inclined magnet.

Another aspect of the present invention provides a manufacturing method of an embedded magnet motor. The method includes: a step for arranging the magnetic sensor to face the axial end surface of the rotor; and a measuring step for measuring magnetic characteristics detected by the magnetic sensor at every radial positions when the radial position of the magnetic sensor is changed. The method further includes a positioning step for determining the radially outer region based on the result of the measuring step and determining the position of the magnetic sensor in the radially outer region.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 26 is a perspective view illustrating the rotor core of FIG. 24;

FIG. 26A is an enlarged perspective view illustrating a radially inner end of one of the radial accommodating slots of FIG. 26;

FIG. 27 is a plan view illustrating an embedded magnet motor according to a tenth embodiment;

DESCRIPTION OF THE PREFERRED EMBODIMENTS

Figure 1:
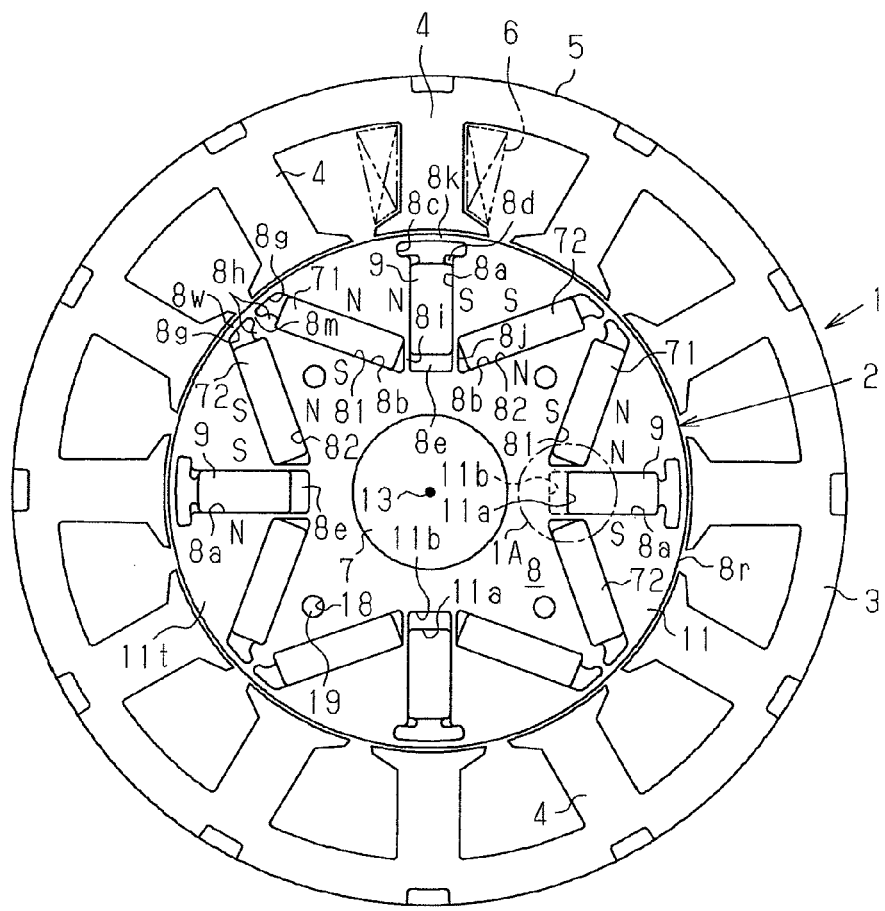
FIG. 1 is a plan view illustrating an embedded magnet motor according to a first embodiment of the present invention.
Figure 2:
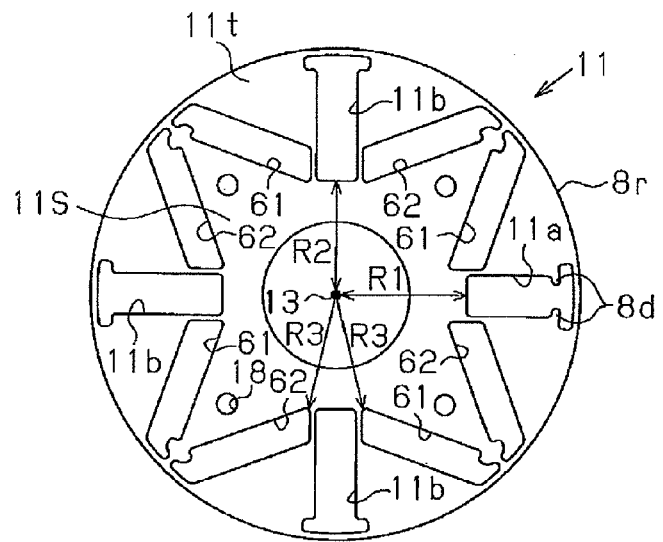
FIG. 2 is a plan view illustrating the core sheet of FIG. 1.
Figure 3:
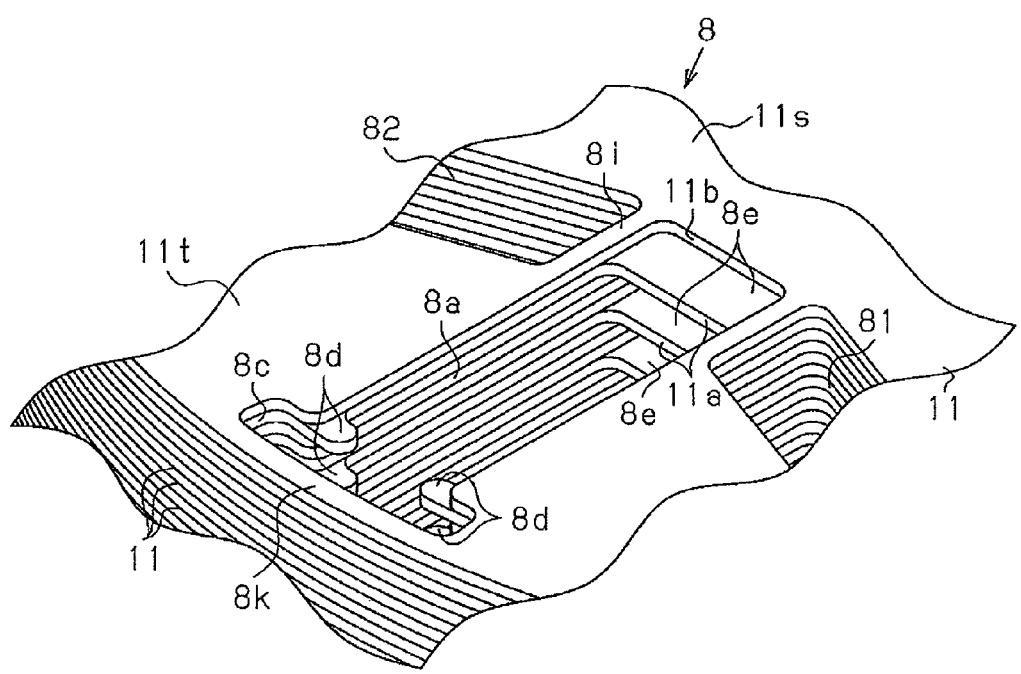
FIG. 3 is an enlarged perspective view illustrating the rotor core of FIG. 1, and is a perspective view looking at a radially inner section from a radially outer section.

FIGS. 1 to 3 show a first embodiment of the present invention.

FIG. 1 shows an embedded magnet motor according to the first embodiment. The embedded magnet motor includes a stator 1 and a rotor 2. The embedded magnet motor is an inner rotor motor. The axis of the rotor 2, that is, the central axis is referred to as a rotor axis 13.

The stator 1 is formed to be substantially cylindrical as a whole. The stator 1 includes a stator core 5 and coils 6. The stator core 5 includes a cylindrical portion 3 and teeth 4. The cylindrical portion 3 forms the outer shape of the stator 1. The teeth 4, the number of which is twelve, extend from the inner circumferential surface of the cylindrical portion 3 toward the rotor axis 13. The teeth 4 are located at equal angular intervals in the circumferential direction of the cylindrical portion 3.

Each coil 6 is wound around one of the teeth 4 via an insulator (not shown) by concentrated winding. FIG. 1 shows only one of the coils 6 with a chain double-dashed line.

The rotor 2 includes a rotating shaft 7, a rotor core 8, four radial magnets 9, four first inclined magnets 71, and four second inclined magnets 72. The rotor core 8 is secured to the rotating shaft 7. The number of the magnetic poles of the rotor 2 is expressed by P. In the first embodiment, the number of the magnetic poles P is set equal to eight. In the first embodiment, the diameter of the rotor 2, that is, the diameter of the rotor core 8 is set to 30 mm. The radial magnets 9, the first inclined magnets 71, and the second inclined magnets 72 are substantially rectangular solid.

FIG. 2 shows a core sheet 11. The rotor core 8 is formed to be substantially cylindrical by laminating several core sheets 11 in the axial direction as shown in FIG. 3. The core sheets 11 are laminated while being displaced one at a time by $360/(P/2)°$ in the circumferential direction around the rotor axis 13. That is, in the first embodiment, the core sheets 11 are laminated while being rotated by 90° one at a time. Each core sheet 11 includes four fastening slots 18. Fastening members, which are rivets 19 in the first embodiment, are inserted through the fastening slots 18 to secure the core sheets 11. The rotating shaft 7 is fitted in the central hole of the rotor core 8. As a result, the rotor core 8 is rotatably supported inside the stator 1.

The rotor core 8 includes four radial accommodating slots 8a, four first inclined accommodating slots 81, and four second inclined accommodating slots 82. A pair of each first inclined accommodating slot 81 and the associated second inclined accommodating slot 82 form a V-shaped accommodating slot 8b. When the rotor core 8 is viewed from the axial direction, the V-shaped accommodating slots 8b are substantially V-shaped pointing radially outward of the rotor core 8. Each pair of the first inclined accommodating slot 81 and the second inclined accommodating slot 82 approach each other in a radially outward direction. That is, the rotor core 8 includes four V-shaped accommodating slots 8b. The first inclined accommodating slots 81 and the second inclined accommodating slots 82 are straight lines inclined in different directions with respect to the radial direction of the rotor core 8. Each fastening slot 18 is located at the center of one of the V-shaped accommodating slots 8b. That is, each fastening slot 18 is located between one of the first inclined accommodating slots 81 and the associated second inclined accommodating slot 82. Each first inclined accommodating slot 81 and the associated second inclined accommodating slot 82 do not communicate with each other, and are independent from each other. In FIG. 1, each first inclined accommodating slot 81 is located in the counterclockwise direction from the adjacent radial accommodating slot 8a. Each second inclined accommodating slot 82 is located in the clockwise direction from the adjacent radial accommodating slot 8a.

The number of the radial accommodating slots 8a and the V-shaped accommodating slots 8b are both P/2. Each radial accommodating slot 8a and the V-shaped accommodating slot 8b are formed at equal angular intervals alternately in the circumferential direction of the rotor core 8. In the present embodiment, the radial accommodating slots 8a are arranged at intervals of 90°, and the V-shaped accommodating slots 8b are arranged at intervals of 90°.

The radial accommodating slots 8a and the V-shaped accommodating slots 8b are accommodating slots extending entirely through the rotor core 8 in the axial direction. The radial accommodating slots 8a extend in the radial direction of the rotor core 8. Each of the radial accommodating slots 8a accommodates one of the radial magnets 9. Each of the first inclined accommodating slots 81 accommodates one of the first inclined magnets 71. Each of the second inclined accommodating slots 82 accommodates one of the second inclined magnets 72. Each of the radial magnets 9 and the associated first inclined magnet 71 that are adjacent to each other form a north pole. Each of the radial magnets 9 and the associated second inclined magnet 72 that are adjacent to each other form a south pole. As a result, the rotor core 8 has four north poles and four south poles. The radial magnets 9, the first inclined magnets 71, and the second inclined magnets 72 are magnetized after being arranged in the radial accommodating slots 8a and the V-shaped accommodating slots 8b to facilitate inserting them in the radial accommodating slots 8a and the V-shaped accommodating slots 8b.

As shown in FIG. 1, a wide section, which is a wide slot 8c in the first embodiment, is formed at the radially outer end of each radial accommodating slot 8a. When the rotor core 8 is viewed from the axial direction, a direction perpendicular to the radial direction is referred to as a width direction. The width of the wide slots 8c is set greater than the width of the radial magnets 9. That is, the width of the wide slots 8c is greater than the width of part of the radial accommodating slots 8a other than the wide slots 8c. The wide slots 8c extend entirely through the rotor core 8 in the axial direction.

As shown in FIG. 1, the rotor core 8 includes outer circumferential projections 8d formed at the radially outer end of each radial accommodating slot 8a. A pair of the outer circumferential projections 8d project from both circumferential sides of each radial accommodating slot 8a toward the inside of the radial accommodating slot 8a by the same amount in the circumferential direction. Each pair of outer circumferential projections 8d do not contact each other. The outer circumferential projections 8d are located radially inward than the wide slots 8c. That is, the portion between each radial accommodating slot 8a and the associated wide slot 8c is constricted by the outer circumferential projections 8d. The width between the pair of outer circumferential projections 8d is less than the width of the radial accommodating slots 8a and the width of the wide slots 8c. The outer circumferential projections 8d serve as outer projections that restrict the radial magnets 9 from moving radially outward. That is, the outer circumferential projections 8d prevent displacement of the radial magnets 9.

As shown in FIG. 3, the outer circumferential projections 8d are located at some parts of each radial accommodating slot 8a along the axial direction. In the present embodiment, the number of the core sheets 11 arranged between axially adjacent outer circumferential projections 8d is three.

As shown in FIG. 1, the rotor core 8 includes inner restricting portions 8e formed at the radially inner ends of the radial accommodating slots 8a. The inner restricting portions 8e are inner projections, which project radially outward from the radially inner ends of the radial accommodating slots 8a to the inside of the radial accommodating slots 8a. The width of the inner restricting portions 8e is the same as the width of the radial accommodating slots 8a. The inner restricting portions 8e restrict the radial magnets 9 from moving radially inward.

As shown in FIG. 3, the inner restricting portions 8e are located at some parts of each radial accommodating slot 8a along the axial direction. In the present embodiment, the number of the core sheets 11 arranged between axially adjacent inner restricting portions 8e is three.

As shown in FIG. 1, V-slot outer gaps 8g, in which the first inclined magnet 71 and the second inclined magnet 72 are not arranged, are provided at the radially outer ends of the first inclined accommodating slot 81 and the second inclined accommodating slot 82. The width of the V-slot outer gaps 8g is substantially the same as the width of the first inclined magnets 71 and the second inclined magnets 72. The rotor core 8 has V-slot projections 8*h* located at the radially outer ends of the first inclined accommodating slots 81 and the second inclined accommodating slots 82. The V-slot projections 8*h* are located radially inward than the V-slot outer gaps 8*g*. The V-slot projections 8*h* project toward the inside of the first inclined accommodating slots 81 and the second inclined accommodating slots 82 in the circumferential direction. That is, the portion between each first inclined magnet 71 and the associated V-slot outer gap 8*g* is constricted by one of the V-slot projections 8*h*. The portion between each second inclined magnet 72 and the associated V-slot outer gap 8*g* is also restricted by another V-slot projection 8*h*. The V-slot projections 8*h* restrict the first inclined magnets 71 and the second inclined magnets 72 from moving radially outward, that is, toward the V-slot outer gaps 8*g*. A pair of the V-slot projections 8*h* project in the opposite directions along the circumferential direction by the same amount.

Figure 1A:
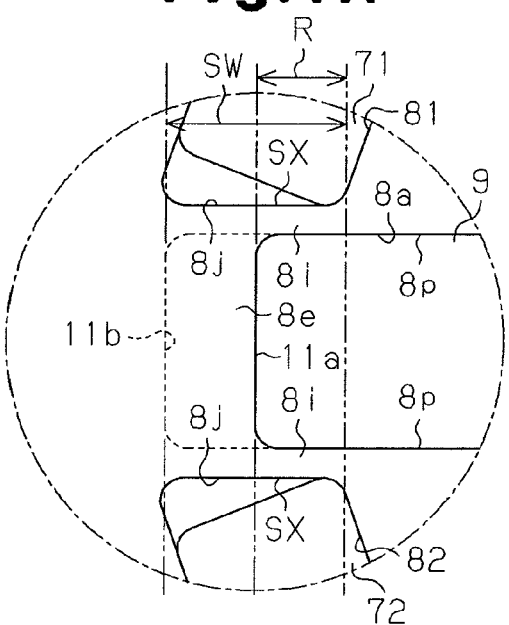
FIG. 1A is an enlarged view illustrating an inner end of one of the radial accommodating slots of FIG. 1.

As shown in FIG. 1A, each radial accommodating slot 8*a* is defined by a pair of radial accommodating slot side surfaces 8*p*, which extend substantially in the radial direction. The radially inner ends of the first inclined accommodating slots and the second inclined accommodating slots 82 have opposing surfaces SX. The opposing surfaces SX face the radial accommodating slot side surfaces 8*p*, and extend substantially parallel to the radial accommodating slot side surfaces 8*p*. An inner bridge 8*i* is located between each opposing surface SX and the associated radial accommodating slot 8*a*. The width of the inner bridges 8*i* is constant along the radial direction. A triangular gap 8*j* is provided at the radially inner end of each of the first inclined accommodating slots 81 and the second inclined accommodating slots 82. The triangular gaps 8*j* are substantially triangular extended portions as viewed from the axial direction. As a result, the opposing surfaces SX are formed.

As shown in FIG. 1, the rotor core 8 has wide outer bridges 8*k* the number of which is expressed by P/2, V-slot outer bridges 8*w* the number of which is expressed by P, and inter-inclined slot bridges 8*m* the number of which is expressed by P/2. The wide outer bridges 8*k* are bridge portions each located between one of the wide slots 8*c* and a rotor outer circumferential surface 8*r*. The rotor outer circumferential surface 8*r* is an outer circumferential surface of the rotor core 8. The V-slot outer bridges 8*w* are bridge portions located between the V-slot outer gaps 8*g* and the rotor outer circumferential surface 8*r*. The inter-inclined slot bridges 8*m* are bridge portions each located between the radially outer end of one of the first inclined accommodating slots 81 and the radially outer end of the associated second inclined accommodating slot 82, and connected to a pair of the V-slot outer bridges 8*w*.

As shown in FIG. 2, each of the core sheets 11 includes a short slot 11*a* and three long slots 11*b*. That is, in each of the core sheets 11, the number of the long slots 11*b* is obtained by subtracting the number of the short slot 11*a* from P/2. The short slot 11*a* and the long slots 11*b* form the radial accommodating slots 8*a* when several core sheets 11 are laminated. That is, the short slot 11*a* and the long slots 11*b* are preformed lamination radial accommodating slots, which are preformed radial accommodating slots in the first embodiment. In other words, the core sheets 11 have the preformed radial accommodating slots the number of which is expressed by P/2.

Furthermore, each of the core sheets 11 has four first preformed inclined accommodating slots 61 and four second preformed inclined accommodating slots 62. The first inclined accommodating slots 81 are formed by laminating the first preformed inclined accommodating slots 61. The second inclined accommodating slots 82 are formed by laminating the second preformed inclined accommodating slots 62. A pair of each first preformed inclined accommodating slot 61 and the associated second preformed inclined accommodating slot 62 form a preformed V-shaped accommodating slot. That is, each of the core sheets 11 has the preformed V-shaped accommodating slots the number of which is expressed by P/2, that is four. The preformed V-shaped accommodating slots are preformed lamination V-shaped accommodating slots, which form the V-shaped accommodating slots 8*b* when laminated.

Each of the core sheets 11 is divided into an inner ring 11*s* and an outer ring 11*t*. The inner ring 11*s* is located radially inward of the short slot 11*a*, the long slots 11*b*, the first preformed inclined accommodating slots 61, and the second preformed inclined accommodating slots 62. The outer ring 11*t* is located radially outward of the same. The inner bridges 8*i* and the inter-inclined slot bridges 8*m* connect the inner ring 11*s* to the outer ring 11*t*. The inner ring 11*s* and the outer ring 11*t* occupy large part of each core sheet 11.

The radially inner end of the short slot 11*a* forms the inner restricting portion 8*e*. The long slots 11*b* extend radially inward than the short slot 11*a*. As shown in FIG. 2, the distance between the radially inner end of the short slot 11*a* and the rotor axis 13 is referred to as a first radial distance R1. The distance between the radially inner end of each long slot 11*b* and the rotor axis 13 is referred to as a second radial distance R2. The distance between the radially inner end of each first inclined accommodating slot 81 and the rotor axis 13 is referred to as a third radial distance R3. In the present embodiment, the third radial distance R3 is equal to the distance between the radially inner end of each second inclined accommodating slot 82 and the rotor axis 13.

The first radial distance R1 is greater than the second radial distance R2 (R2<R1). In the present embodiment, the first radial distance R1 is set greater than the third radial distance R3 (R3<R1). The second radial distance R2 is set less than or equal to the third radial distance R3 (R2≦R3). In the present embodiment, the second radial distance R2 is set substantially equal to the third radial distance R3.

In the first embodiment, the outer circumferential projections 8*d* are provided in only the short slot 11*a* of each core sheet 11.

As shown in FIG. 1A, the dimension of the opposing surfaces SX along the radial accommodating slot side surfaces 8*p* is referred to as an opposing surface dimension SW. The dimension of part of each opposing surface SX corresponding to the short slot 11*a* is referred to as an overlap dimension R. The overlap dimension R is set to satisfy 0<R≦SW/2. In the present embodiment, the overlap dimension R is set equal to SW/2. In the present embodiment, the opposing surface dimension SW is equal to 2 mm, and the overlap dimension R is equal to 1 mm.

The first embodiment has the following advantages.

(1) As shown in FIGS. 1 and 3, the short slots 11*a*, that is, the inner restricting portions 8*e* are arranged at some parts of each radial accommodating slot 8*a* along the axial direction. The inner restricting portions 8*e* restrict the radial magnets 9 from moving radially inward. Portions of each radial accommodating slot 8*a* where the long slots 11*b* are provided form gaps with respect to the associated radial magnet 9. Thus, the magnetic resistance is increased. That is, the long slots 11*b* separate the magnetic paths from the radial magnet 9. As a result, magnetic flux leakage of the embedded magnet motor is reduced. Thus, the effective magnetic flux of the embedded magnet motor is maintained and the torque is easily increased.

For example, in the publication mentioned in BACKGROUND ART, the radially inner ends of the radial magnets are surrounded by the radially inner walls of the radial accommodating slots without any spaces. As a result, parts of the rotor core that form the radially inner ends of the radial accommodating slots configure magnetic paths having small magnetic resistance, which might cause magnetic flux leakage. The present embodiment solves such a problem.

The short slot 11a and the long slots 11b are formed by punching each core sheet 11. For restricting the radial magnets 9 from moving radially inward, for example, projections such as the outer circumferential projections 8d may be provided at the radially inner ends of the radial accommodating slots 8a. However, the short slot 11a and the long slots 11b according to the present embodiment are easily manufactured.

(2) As shown in FIG. 2, each core sheet 11 has only one short slot 11a. The short slot 11a undesirably reduces the magnetic resistance of the core sheet 11. The present embodiment reduces the magnetic flux leakage as compared to a case where each core sheet 11 has several short slots 11a. That is, the magnetic resistance of the rotor core 8 is maximized as a whole.

(3) As shown in FIG. 2, the second radial distance R2 is set less than or equal to the third radial distance R3 (R2≦R3). That is, the distance between the radially inner end of the long slots 11b and the rotor axis 13 is set less than or equal to the distance between the rotor axis 13 and the radially inner end of the first inclined accommodating slots 81. Therefore, the inner bridges 8i, which serve as the magnetic paths, become narrow at least at the portion defined by the long slots 11b. Thus, the magnetic flux leakage is reliably reduced.

(4) As shown in FIG. 2, the first radial distance R1 is set greater than the third radial distance R3 (R3<R1). That is, the distance between the radially inner end of the short slot 11a, that is, the radially inner end of the radial magnet and the rotor axis 13 is set greater than the distance between the rotor axis 13 and the radially inner end of the first inclined accommodating slots 81. The following advantages are obtained by magnetizing the radial magnets 9 after the first inclined magnets 71 and the second inclined magnets 72. That is, magnetic material accommodated in the radial accommodating slots 8a is easily and reliably magnetized while suppressing them from being affected by the first inclined magnets 71 and the second inclined magnets 72. Thus, inefficiency of the radial magnets 9 is reduced. This advantage was confirmed by the following experiment. That is, when the first radial distance R1 was substantially equal to the third radial distance R3, the radially inner ends of the radial magnets 9 were poorly magnetized, that is, there were inefficiency caused in the magnets when the radial magnets 9 were magnetized after the first inclined magnets 71 and the second inclined magnets 72 were magnetized. To solve this problem, R3 is set smaller than R1 (R3<R1).

(5) As shown in FIG. 1A, the opposing surfaces SX are provided at the radially inner ends of the first inclined accommodating slots 81 and the second inclined accommodating slots 82. Thus, the width of each inner bridge 8i is constant along the radial direction. Therefore, the width of the inner bridges 8i, or the magnetic paths, is made evenly narrow along the radial direction, which further reduces the magnetic flux leakage.

Figure 4:
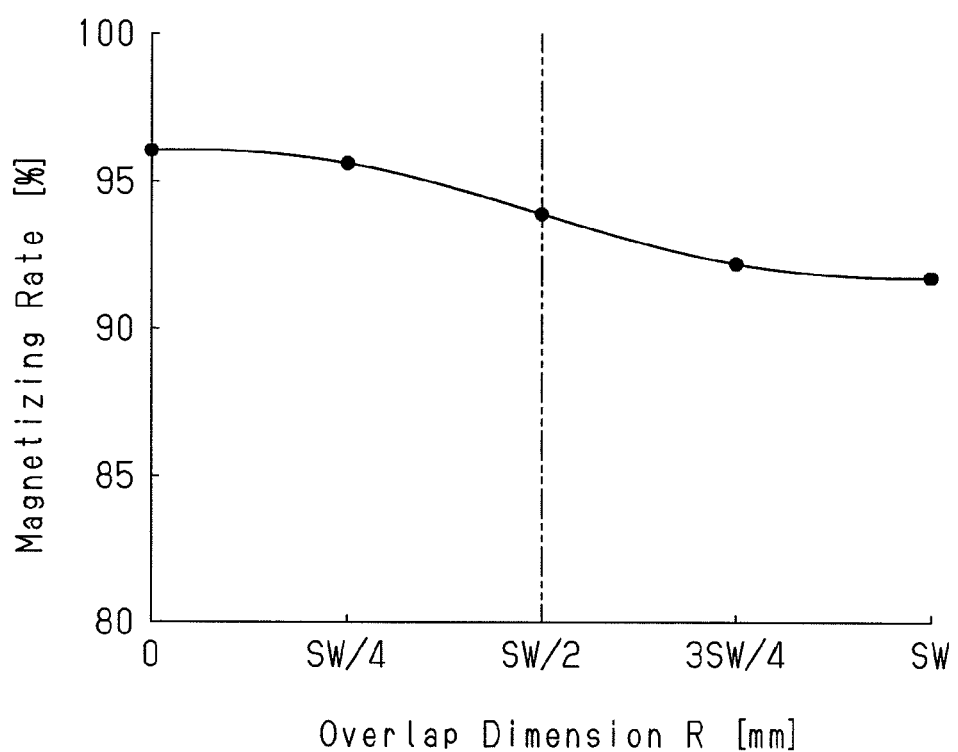
FIG. 4 is a characteristic diagram showing the relationship between the overlap dimension R shown in FIG. 1A and the magnetizing rate of the radial magnets. The overlap dimension R is an overlapping amount of the opposing surface SX and the short slot.

(6) FIG. 4 shows the experimental result of the relationship between the ratio of the overlap dimension R to the opposing surface dimension SW and the magnetizing rate of the radially inner ends of the radial magnets 9. The magnetizing rate is reduced in the order of R=0, R=SW/4, R=SW/2, R=3SW/4, and R=SW. That is, the magnetizing rate is reduced when the overlap ratio R/SW is increased. When 0<R≦SW/2, the magnetizing rate is greater than a case when SW/2<R≦SW. Thus, in the first embodiment, to satisfy 0<R≦SW/2, R is set equal to SW/2 (R=SW/2). Therefore, a suitable magnetizing rate is obtained, and inefficiency of the radial magnets 9 is reduced in a suitable manner.

(7) The core sheets 11 as shown in FIG. 2 are laminated while being displaced one at a time by 360/(P/2)° in the circumferential direction. In the present embodiment, the core sheets 11 are laminated while being rotated by 90° each to form the rotor core 8. Thus, the operation of rotating and laminating the core sheets 11 is constant, which facilitates the manufacture. That is, the laminating process of the core sheets 11 is easily automated.

As shown in FIG. 3, by laminating the core sheets 11 while displacing them by a certain angle, the short slots 11a, that is, the inner restricting portions 8e are arranged at regular intervals in each radial accommodating slot 8a along the axial direction. In the present embodiment, three core sheets 11 are arranged between axially adjacent inner restricting portions 8e. Therefore, the inner restricting portions 8e are provided regularly along the axial direction. The inner restricting portions 8e support the radial magnets 9 in a balanced manner. This is because the inner restricting portions 8e arranged at equal intervals along the axial direction evenly restrict the radial magnets 9 from moving radially inward at regular intervals in the axial direction.

FIGS. 5 to 8 show an embedded magnet motor according to a second embodiment of the present invention.

Figure 5:
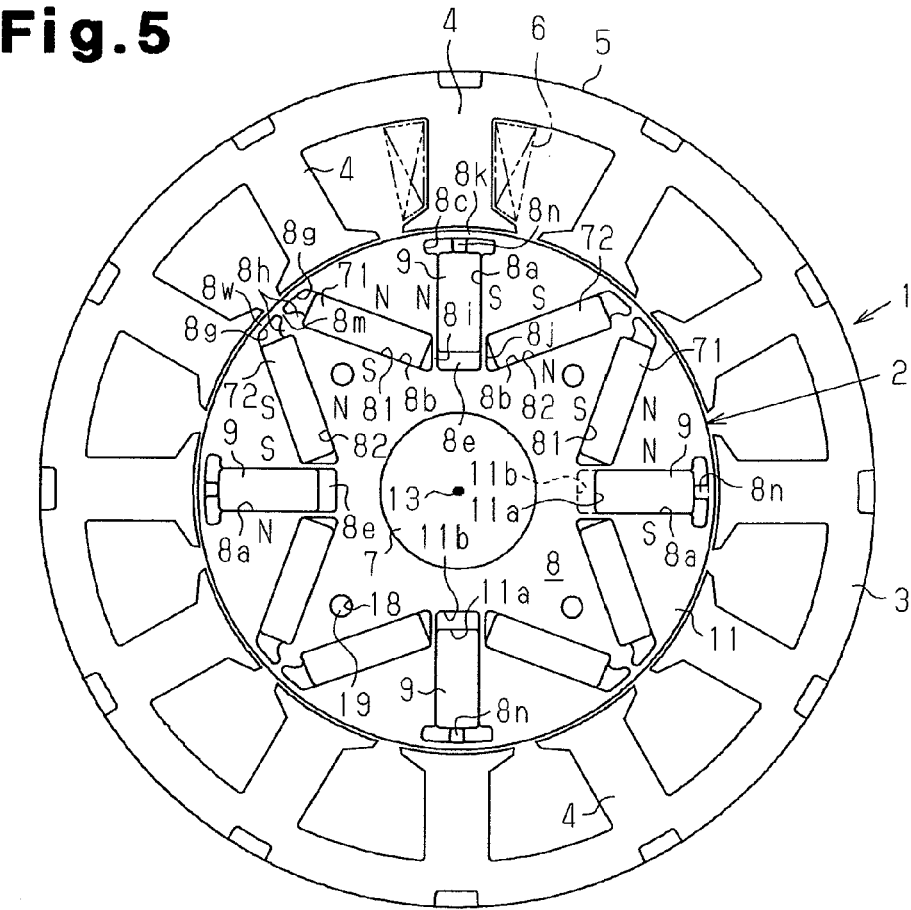
FIG. 5 is a plan view illustrating an embedded magnet motor according to a second embodiment.

As shown in FIG. 5, the rotor core 8 of the second embodiment includes inward projections 8n the number of which is expressed by P/2 instead of the outer circumferential projections 8d. The inward projections 8n project radially inward from the radially outer ends of the radial accommodating slots 8a. The width of the radial magnets 9 is referred to as a first width W1. The width of the wide slots 8c is referred to as a second width W2. The width of the inward projections 8n is referred to as a third width W3.

In this case, W3<W1<W2 is satisfied.

That is, the width of the inward projections 8n is smaller than the width of the radial magnets 9. Each inward projection 8n is located at the middle of one of the wide slots 8c in the circumferential direction. The inward projections 8n restrict the radial magnets 9 from moving radially outward.

Figure 6:
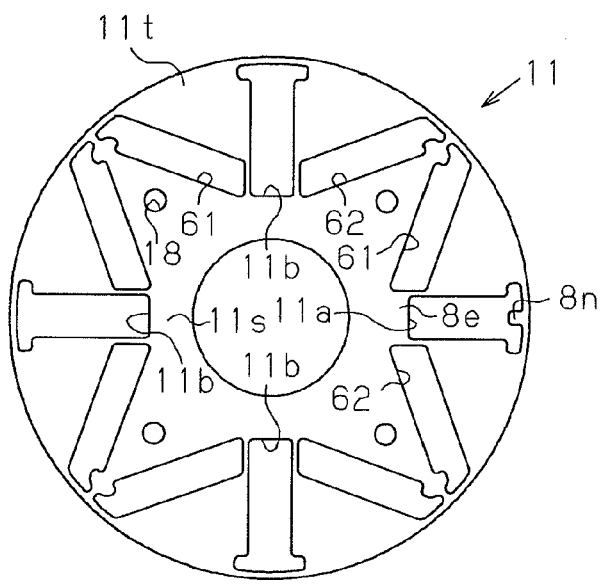
FIG. 6 is a plan view illustrating the core sheet of FIG. 5.

As shown in FIG. 6, the core sheets 11 of the present embodiment include the inward projections 8n only in the short slots 11a. The core sheets 11 of FIG. 6 are laminated around the rotor axis 13 while being rotated one at a time by 360/(P/2)°, that is, by 90°. As a result, the rotor core 8 is manufactured. The radial dimension of the radial magnets 9 of FIG. 5 may be greater than the radial dimension of the radial magnets 9 of FIG. 1. This is because the outer circumferential projections 8d are not provided in FIG. 5.

A dimension obtained by subtracting the radial dimension of part of the radial magnet 9 facing the inner bridge 8i from the radial dimension of the radial magnet 9 is referred to as an exposed dimension of the radial magnet 9. That is, the exposed dimension of the radial magnet 9 represents the dimension of part of magnetic flux input and output surfaces of the radial magnet 9 facing magnetic flux input and output surfaces of the first inclined magnet 71 and the second inclined magnet 72. The magnetic flux input and output surfaces of the radial magnet 9 are surfaces that contact the radial accommodating slot side surfaces 8p. The magnetic flux input and output surfaces of each first inclined magnet 71 are surfaces extending along the first inclined magnet 71. In the case of FIG. 5, the exposed dimension of the radial magnets 9 is set to 4.75 mm. In the case of FIG. 1, if the radial dimension of the outer circumferential projections 8d is set to 0.5 mm, the exposed dimension of the radial magnets 9 is 4.25 mm. That is, the exposed dimension of the radial magnets 9 of FIG. 1 is smaller than the exposed dimension of the radial magnets 9 of FIG. 5 by the amount corresponding to the radial dimension of the outer circumferential projections 8d.

As a result, according to the result of experiments conducted using the same amount of current, the applied torque of the embedded magnet motor of FIG. 5 was higher than the applied torque of the embedded magnet motor of FIG. 1 by 4%. Also, the cogging torque of the embedded magnet motor of FIG. 5 was lower than the cogging torque of the embedded magnet motor of FIG. 1 by 27%. Further, the torque ripple of the embedded magnet motor of FIG. 5 was lower than the torque ripple of the embedded magnet motor of FIG. 1 by 7%.

The second embodiment has the following advantages.

(8) Each of the inward projections 8n is located at the middle of one of the wide slots 8c in the circumferential direction. The radial dimension of the inward projections 8n is set equal to the radial dimension of the wide slots 8c. Thus, the radial position of the distal end of each inward projection 8n matches the radial position of the radially inner end of the associated wide slot 8c. For example, since the outer circumferential projections 8d of FIG. 1 project in the radial accommodating slots 8a, the outer circumferential projections 8d obstruct the radial magnets 9 from extending close to the wide slots 8c. However, since the inward projections 8n of FIG. 5 are provided only in the wide slots 8c, the radial magnets 9 are allowed to extend close to the wide slots 8c. Thus, the efficiency of the embedded magnet motor of FIG. 5 is improved easily as compared to the embedded magnet motor of FIG. 1.

Figure 7:
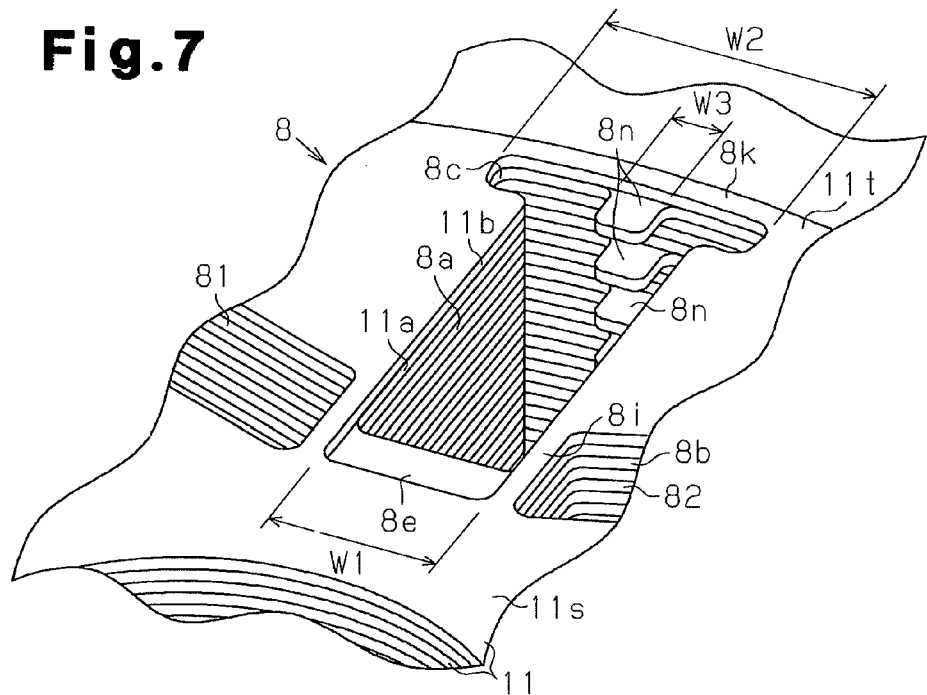
FIG. 7 is an enlarged perspective view illustrating the rotor core of FIG. 5, and is a perspective view looking at a radially outer section from a radially inner section.

(9) As shown in FIG. 7, the width of the inward projections 8n of the present embodiment is set to approximately ⅓ of the width of the radial magnets 9. That is, the width of the inward projections 8n is set to less than or equal to ½ the width of the radial magnets 9. For example, the pair of outer circumferential projections 8d of FIG. 1 reduce the width of the associated radial accommodating slot 8a. That is, the outer circumferential projections 8d form a narrow portion in the associated radial accommodating slot 8a, which may cause magnetic flux leakage. This is because although the pair of outer circumferential projections 8d are separate from each other, the outer circumferential projections 8d extend from the radial accommodating slot side surfaces 8p, and therefore reduces the gap between the radial accommodating slot side surfaces 8p.

However, the width of the inward projections 8n of FIG. 5 is set such that the inward projections 8n are separate from the radial accommodating slot side surfaces 8p, and is set smaller than the width of the radial magnets 9. Thus, the inward projections 8n of FIG. 5 do not easily form a magnetic path of magnetic flux leakage, and readily reduce the magnetic flux leakage. Thus, the embedded magnet motor of FIG. 5 easily increases the efficiency as compared to the embedded magnet motor of FIG. 1.

(10) The inward projections 8n are formed at some parts of each radial accommodating slot 8a along the axial direction. That is, the inward projections 8n are formed at some parts of the rotor core 8 along the axial direction. The number of the core sheets 11 arranged between axially adjacent inward projections 8n is three. Thus, for example, as compared to a case where the inward projections 8n extend entirely along the axial direction, the magnetic resistance of the entire radial accommodating slots 8a is increased. Thus, the magnetic flux leakage is further reduced. That is, the inward projections 8n are suppressed from undesirably reducing the magnetic resistance.

(11) As shown in FIG. 6, each of the core sheets 11 includes the short slot 11a provided with the inward projection 8n, and the long slots 11b, which do not have the inward projections 8n. By laminating such core sheets 11, the rotor core 8 is easily manufactured such that the inward projections 8n are located only at some parts of the rotor core 8 along the axial direction.

(12) The inward projection 8n is located only in the short slot 11a of each core sheet 11. That is, the inner restricting portion 8e and the inward projection 8n are both provided in the short slot 11a of each core sheet 11. Thus, the inner restricting portions 8e and the inward projections 8n are both located at the same axial positions in each radial accommodating slot 8a. Thus, each radial magnet 9 is restricted from moving radially outward and radially inward at the same axial position. Thus, the radial magnets 9 are retained in a balanced manner.

Figure 9:
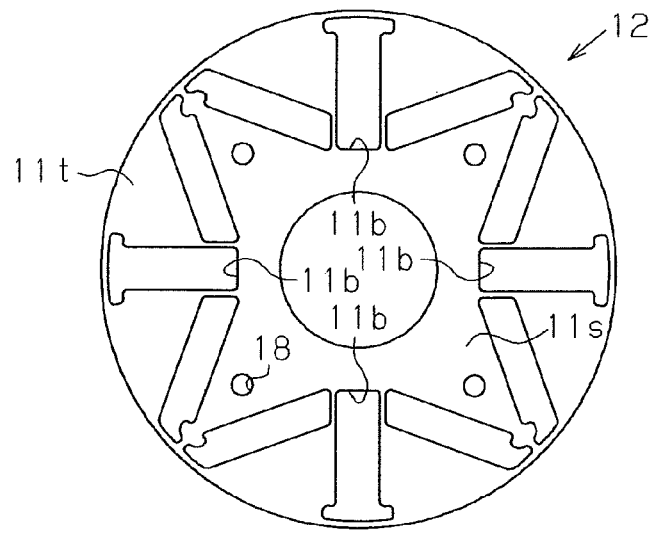
FIG. 9 is a plan view illustrating a core sheet according to a third embodiment.
Figure 10:
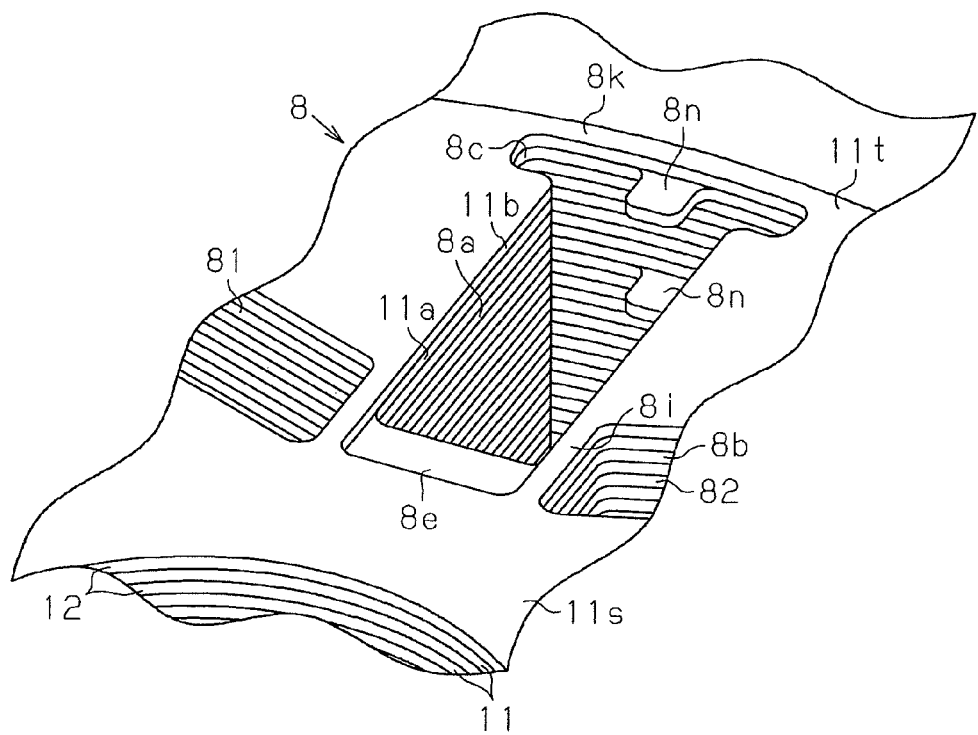
FIG. 10 is an enlarged perspective view illustrating the rotor core formed by laminating core sheets of FIG. 9, and is a perspective view looking at a radially outer section from a radially inner section.

FIGS. 9 and 10 show a third embodiment.

The rotor core 8 of FIG. 10 may be formed by laminating the core sheets 12 of FIG. 9 and the core sheets 11 of FIG. 6. That is, the embodiment is not limited to laminating only one type of the core sheets 11. The core sheet 12 of FIG. 9 does not have the short slot 11a, and the preformed radial accommodating slots the number of which is expressed by P/2 are all long slots 11b. The inward projections 8n are located at some parts of each radial accommodating slot 8a along the axial direction. The number of the core sheets 11 located between axially adjacent inward projections 8n is seven. The core sheets 11 of FIG. 6 are laminated while being rotated by 90° each. The number and amount of the inner restricting portions 8e and the inward projections 8n provided along the axial direction of the rotor core 8 of FIG. 10 are less than those of the rotor core 8 of FIG. 1 or FIG. 5. Thus, the rotor core 8 of FIG. 10 further increases the magnetic resistance, and further reduces the magnetic flux leakage.

Figure 11:
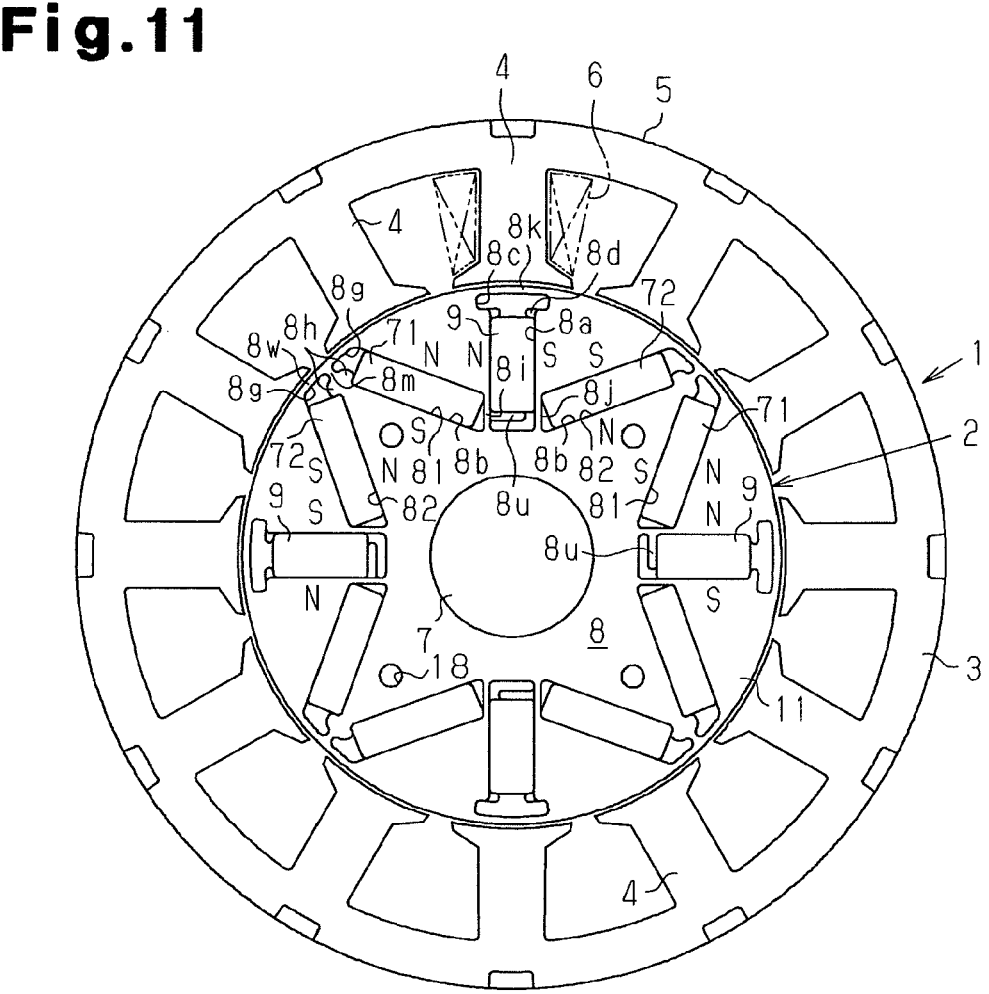
FIG. 11 is a plan view illustrating an embedded magnet motor according to a fourth embodiment.
Figure 12:
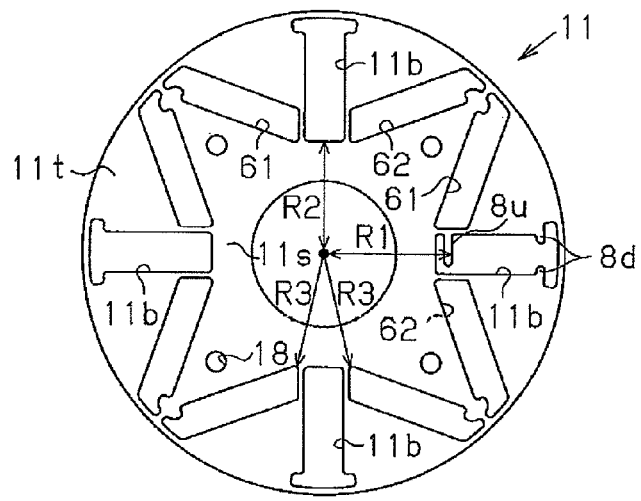
FIG. 12 is a plan view illustrating the core sheet of FIG. 11.
Figure 13:
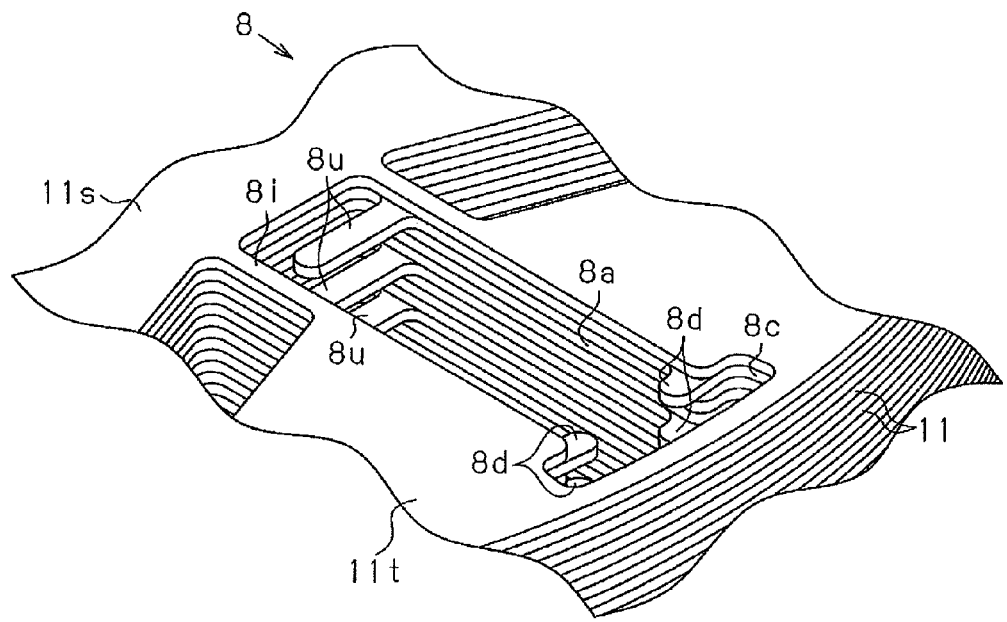
FIG. 13 is an enlarged perspective view illustrating the rotor core of FIG. 11, and is a perspective view looking at a radially inner section from a radially outer section.

FIGS. 11 to 13 show a fourth embodiment of the present invention.

As shown in FIG. 13, the wide slots 8c and the pairs of outer circumferential projections 8d are located at the radially outer end of each radial accommodating slot 8a. The number of the core sheets 11 located between axially adjacent outer circumferential projections 8d is three.

As shown in FIG. 11, the rotor core 8 includes inner circumferential projections 8u in each radial accommodating slot 8a. The inner circumferential projections 8u are slightly separated from the radially inner end of each radial accommodating slot 8a. In the present embodiment, the projection amount of each inner circumferential projection 8u from the associated radial accommodating slot side surface 8p is set greater than half the width of the radial accommodating slot 8a. As a result, the inner circumferential projections 8u restrict the radial magnets 9 from moving radially inward.

The inner circumferential projections 8u are provided only on one of the pair of radial accommodating slot side surfaces 8p. In the case of FIG. 11, the inner circumferential projections 8u project in the circumferential direction only from the radial accommodating slot side surface 8p in the counterclockwise direction to be located in the radial accommodating slots 8a. The inner circumferential projections 8u are located at some parts of the radial accommodating slots 8a along the axial direction. As shown in FIG. 13, the number of the core sheets 11 provided between axially adjacent inner circumferential projections 8u is three.

As shown in FIG. 12, each core sheet 11 has the long slots 11b the number of which is expressed by P/2, that is, four. The radial dimension of the long slots 11b is greater than the radial dimension of the radial magnets 9. In the present embodiment, each core sheet 11 has the inner circumferential projection 8u and the pair of outer circumferential projections 8d only in one of the long slots 11b. That is, in the present embodiment, the inner circumferential projection 8u and the outer circumferential projections 8d are not formed in three of the long slots 11b of each core sheet 11. The distance between the rotor axis 13 and the inner circumferential projection 8u is referred to as the first radial distance R1.

The fourth embodiment has the following advantages.

(13) As shown in FIG. 13, the inner circumferential projections 8u are located at some parts of each radial accommodating slot 8a along the axial direction. The inner circumferential projections 8u restrict the radial magnets 9 from moving radially inward. The radial dimension of the radial accommodating slots 8a is greater than the radial dimension of the radial magnets 9. The radially inner ends of the radial accommodating slots 8a are separate from the radial magnets 9 since the inner circumferential projections 8u are provided. That is, the magnetic path is separate from the radial magnets 9. Thus, the magnetic resistance at the radially inner ends of the radial accommodating slots 8a is increased, and thus the magnetic flux leakage is reduced.

As shown in FIGS. 11 and 13, the inner circumferential projections 8u are located on only one of the pair of radial accommodating slot side surfaces 8p. Thus, for example, as compared to a case where the inner circumferential projections 8u are located on both of the pair of radial accommodating slot side surfaces 8p, punching of the core sheets 11 of FIGS. 11 to 13 is easy, which facilitates the manufacture.

(14) As shown in FIG. 12, each core sheet 11 includes only one inner circumferential projection 8u. Thus, for example, as compared to a case where each core sheet 11 includes several inner circumferential projections 8u, the magnetic resistance of the entire rotor core 8 is increased, and the magnetic flux leakage is reduced.

(15) The second radial distance R2 is set less than or equal to the third radial distance R3. In the present embodiment, the second radial distance R2 is set slightly less than the third radial distance R3. Thus, the magnetic paths, which are the inner bridges 8i in the fourth embodiment, are narrowed, and the magnetic flux leakage is reduced.

(16) The first radial distance R1 is set greater than the third radial distance R3 (R3<R1). Therefore, when magnetizing the radial magnets 9 after the first inclined magnets 71 and the second inclined magnets 72, the radial magnets 9 are not easily affected by the first inclined magnets 71 and the second inclined magnets 72, and are easily and reliably magnetized. Thus, the inefficiency of the radial magnets 9 is reduced.

(17) The core sheets 11 shown in FIG. 12 are laminated while being displaced one at a time by 360/(P/2)°, that is, by 90° in the circumferential direction. Therefore, the operation of rotating and laminating the core sheets 11 is constant, which facilitates automation. Also, since the inner circumferential projections 8u are provided at regular intervals in the axial direction, the radial magnets 9 are supported in a balanced manner.

Figure 14:
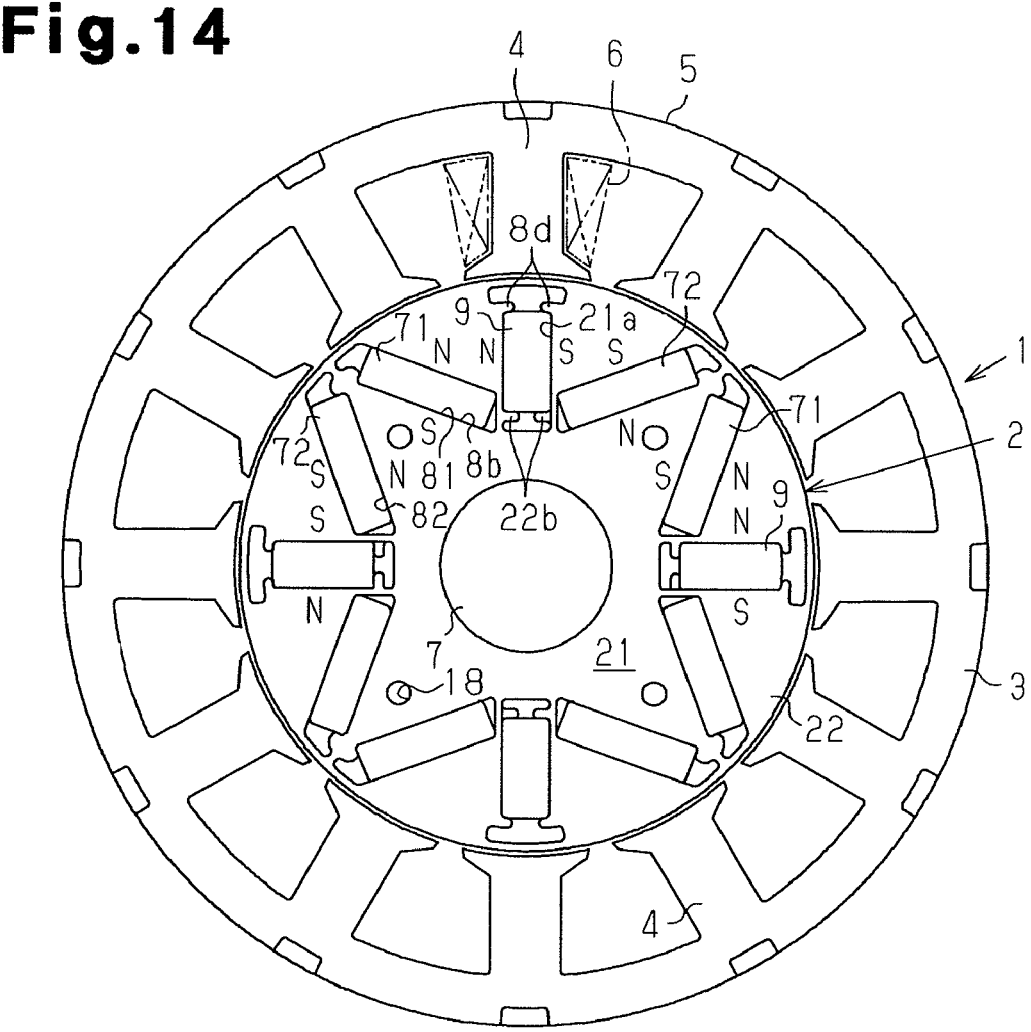
FIG. 14 is a plan view illustrating an embedded magnet motor according to a fifth embodiment.
Figure 15:
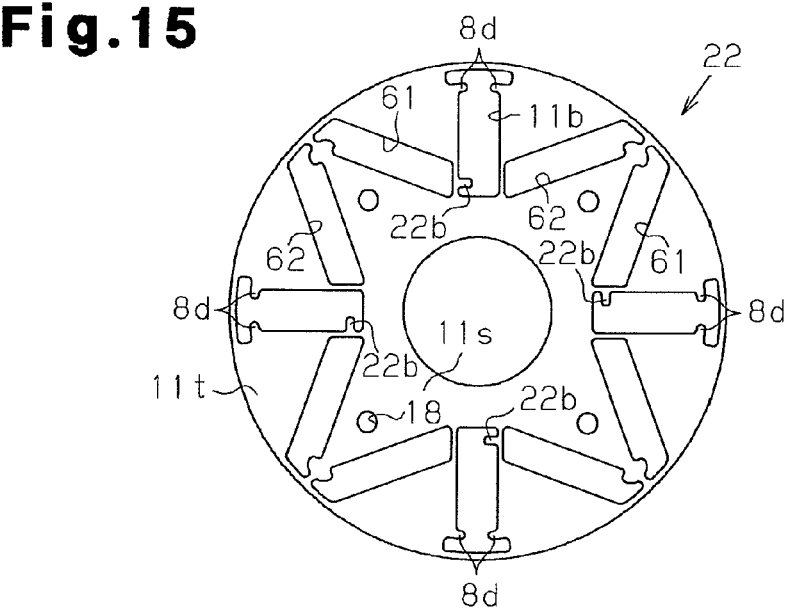
FIG. 15 is a plan view illustrating the core sheet of FIG. 14.
Figure 16:
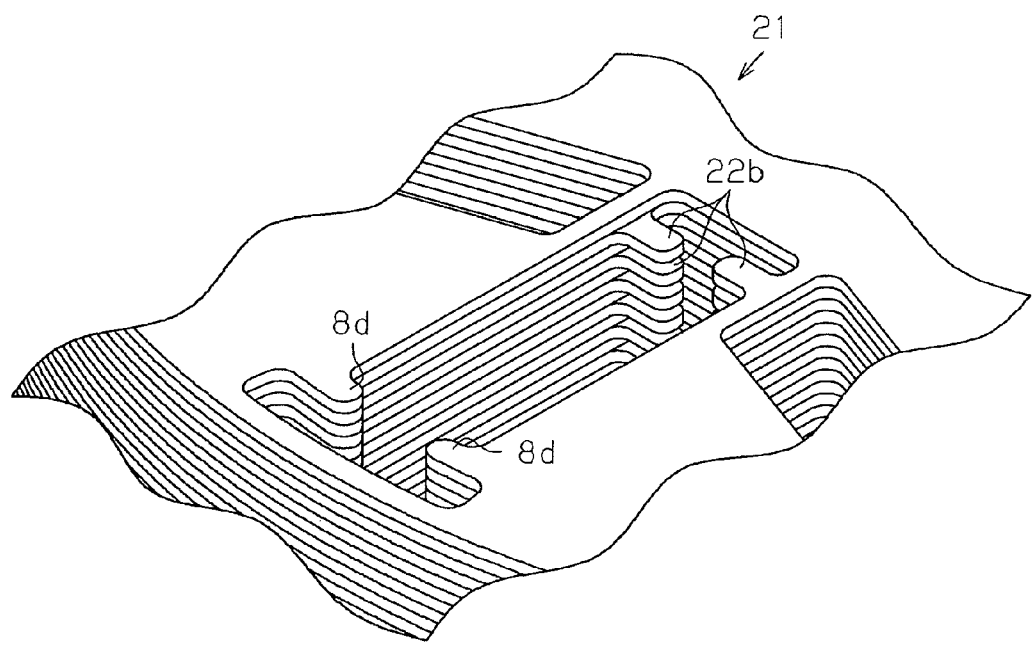
FIG. 16 is an enlarged perspective view illustrating the rotor core of FIG. 14, and is a perspective view looking at a radially inner section from a radially outer section.

FIGS. 14 to 16 show a fifth embodiment of the present invention.

FIG. 14 shows a rotor core 21 according to the fifth embodiment. As shown in FIGS. 14 and 16, inner radial projections 22b are provided on both of the pair of radial accommodating slot side surfaces 8p of radial accommodating slots 21a.

As shown in FIG. 15, each core sheet 22 includes the long slots 11b the number of which is expressed by P/2. All the long slots 11b are provided with one of the inner radial projections 22b. The inner radial projection 22b is located on only one of the circumferential sides of each long slot 11b. In FIG. 15, the inner radial projection 22b is located on only the counterclockwise side surface. The pair of outer circumferential projections 8d are formed in all the long slots 11b.

The core sheets 22 of FIG. 15 are laminated with each core sheet 22 being turned over the preceding core sheet 22 to form the rotor core 21 of FIG. 14. As shown in FIG. 16, the inner radial projections 22b are arranged in a staggered pattern along the axial direction.

The fifth embodiment has the following advantages.

(18) The inner radial projections 22b project from the alternate radial accommodating slot side surfaces 8p per each core sheet 11. Thus, the inner radial projections 22b of FIG. 16 support the radial magnets 9 in a more balanced manner as compared to the inner circumferential projections 8u of FIG. 13.

(19) The same number of the inner radial projections 22b are arranged on each of the pair of radial accommodating slot side surfaces 8p. Thus, the balance of the rotor core 21 such as the rotation balance is satisfactory. This reduces vibration caused by imbalance of the rotor core 21.

(20) The projection amount of the inner radial projections 22b is set less than half the width of the radial accommodating slots 21a. Thus, the inner radial projections 22b are prevented from contacting each other. That is, the magnetic resistance of the rotor core 21 is suppressed from being reduced. In other words, the magnetic path is suppressed from being shortened.

Figure 17:
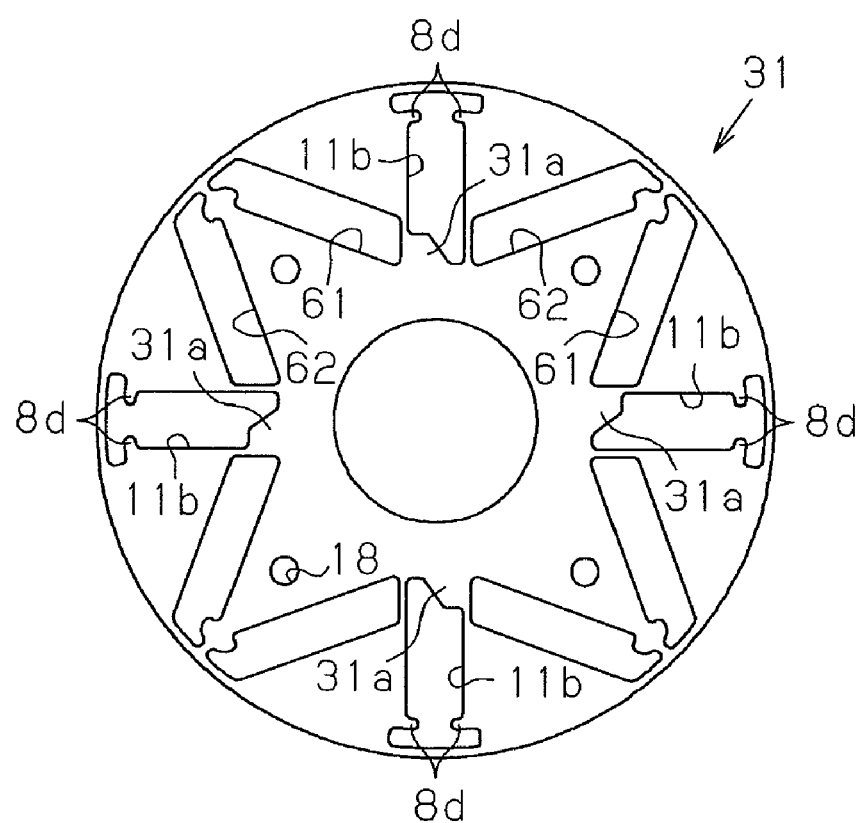
FIG. 17 is a plan view illustrating a core sheet according to a sixth embodiment.

FIG. 17 shows a core sheet 31 according to a sixth embodiment.

The core sheet 31 includes inner radial projections 31a the number of which is P/2. Each inner radial projection 31a bulges radially outward from one of the widthwise corners of the radially inner end of one of the long slots 11b. That is, the inner radial projections 31a are not separate from the radially inner ends of the radial accommodating slots 8a. The width of the long slots 11b is reduced toward the radially inner end. In each core sheet 31, the inner radial projections 31a are arranged in all the four long slots 11b. The rotor core is formed by laminating several core sheets 31 without rotating them. The rigidity of the inner radial projections 31a of FIG. 17 is greater than the rigidity of the inner circumferential projections 8u of FIG. 13 and the rigidity of the inner radial projections 22b of FIG. 16. Thus, the inner radial projections 31a of FIG. 17 are not easily deformed, and the radial magnets 9 are strongly restricted from moving radially inward. To increase the length of the magnetic path, the embodiments illustrated in FIGS. 13 and 16 are preferred than the embodiment of FIG. 17.

Figure 18:
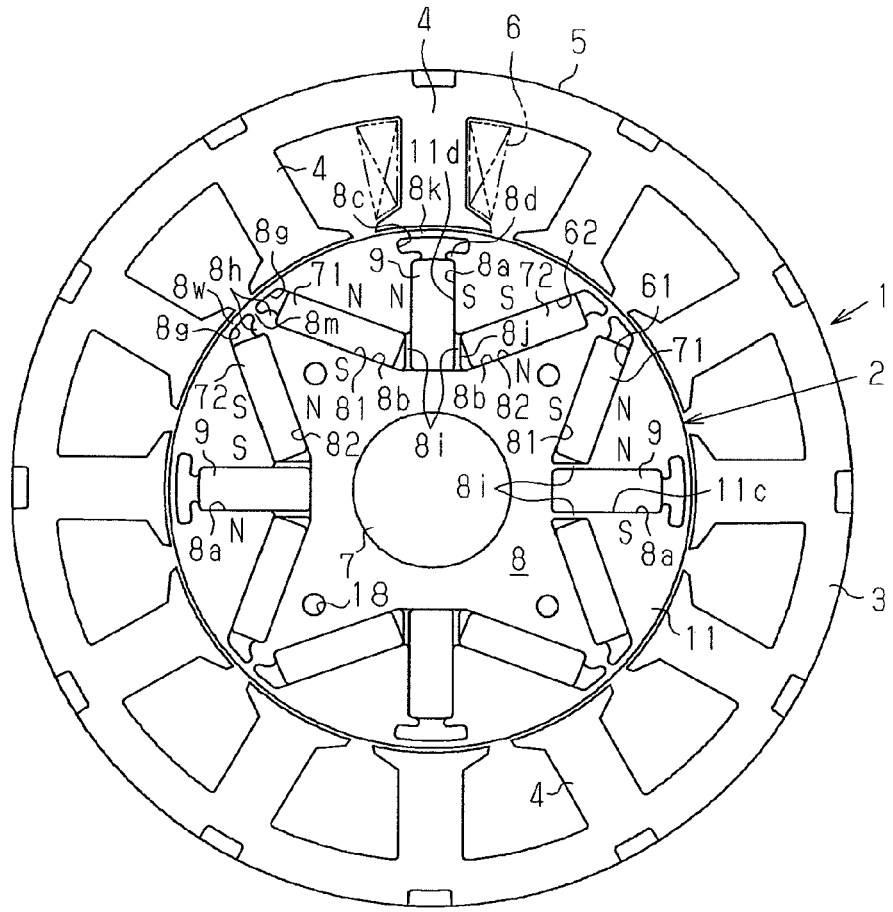
FIG. 18 is a plan view illustrating an embedded magnet motor according to a seventh embodiment.
Figure 19:
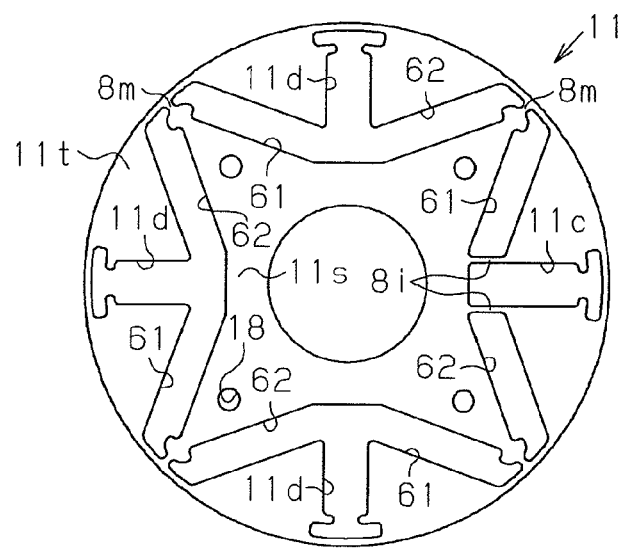
FIG. 19 is a plan view illustrating the core sheet of FIG. 18.
Figure 20:
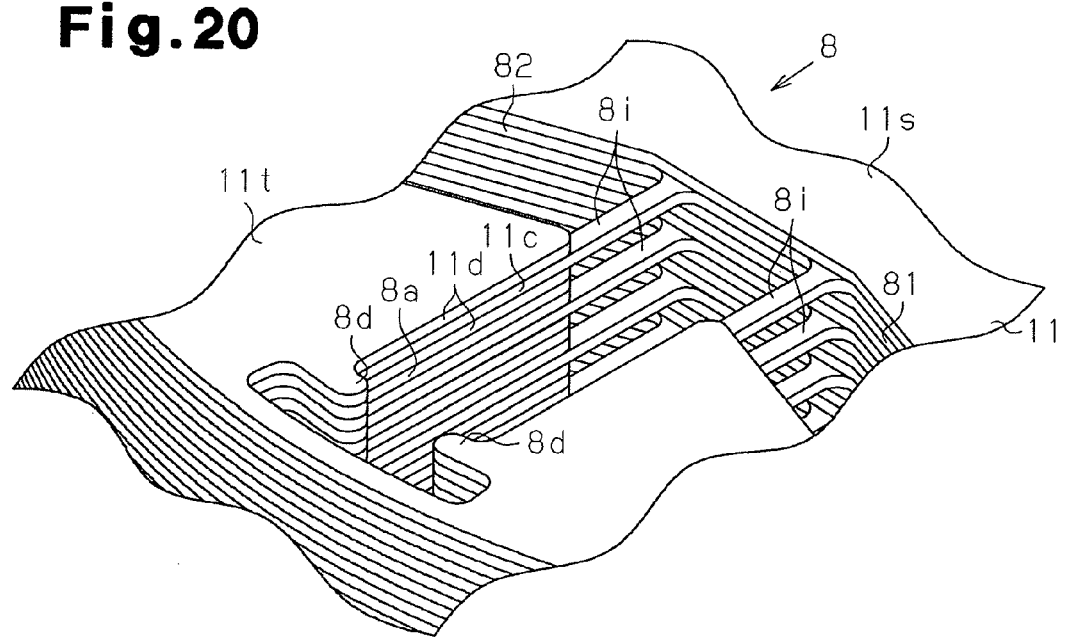
FIG. 20 is an enlarged perspective view illustrating the rotor core of FIG. 18, and is a perspective view looking at a radially inner section from a radially outer section.

FIGS. 18 to 20 show a seventh embodiment of the present invention.

The wide slots 8c extend through the rotor core 8 entirely in the axial direction. The pair of outer circumferential projections 8d are arranged between each wide slot 8c and the radially outer end of the associated radial accommodating slot 8a. The outer circumferential projections 8d are provided over the entire axial direction of the rotor core 8. The projecting amounts of the outer circumferential projections 8d are the same.

As shown in FIG. 20, the inner bridges 8i of the present embodiment are located at some parts along the axial direction. The number of the core sheets 11 provided between axially adjacent inner bridges 8*i* is three.

As shown in FIG. 19, each of the core sheets 11 includes one independent slot 11*c* and three both-side communication slots 11*d*. The independent slot 11*c* and the both-side communication slots 11*d* are the preformed radial accommodating slots the number of which is four, that is, P/2. The radially inner end of each both-side communication slot 11*d* communicates with the circumferentially adjacent first preformed inclined accommodating slot 61 and the second preformed inclined accommodating slot 62. The independent slot 11*c* communicate neither with the first preformed inclined accommodating slot 61 nor with the second preformed inclined accommodating slot 62. That is, the inner bridge 8*i* is provided between the independent slot 11*c* and the first preformed inclined accommodating slot 61. The inner bridge 8*i* is also provided between the independent slot 11*c* and the second preformed inclined accommodating slot 62.

The seventh embodiment has the following advantages.

(21) The independent slot 11*c* is located at some parts of each radial accommodating slot 8*a* along the axial direction. As a result, the inner bridges 8*i* restrict the first inclined magnets 71 and the second inclined magnets 72 from moving radially inward. As a result, the first inclined magnets 71 and the second inclined magnets 72 are restricted from moving radially inward at some parts of the rotor core 8 along the axial direction. That is, gaps are provided between some parts of each radial accommodating slot 8*a* corresponding to the both-side communication slots 11*d* and the inner end of the associated first inclined magnet 71 since the inner bridges 8*i* are not provided. Gaps are also provided between some parts of each radial accommodating slot 8*a* corresponding to the both-side communication slots 11*d* and the radially inner end of the associated second inclined magnet 72. Thus, the magnetic resistance is increased at the radially inner ends of the first inclined magnets 71 and the second inclined magnets 72, and the magnetic flux leakage is reduced.

The both-side communication slots 11*d* and the independent slot 11*c* are easily manufactured by punching each core sheet 11. The punching of the both-side communication slots 11*d* and the independent slot 11*c* is easier than, for example, forming projections such as the inner restricting portions 8*e* of FIG. 1. The inner bridges 8*i* connect the inner ring 11*s* of each core sheet 11 to the outer ring lit in the radial direction. Thus, the inner bridges 8*i* have high strength although the inner bridges 8*i* are thin in the direction of restricting the movement of the first inclined magnets 71 and the second inclined magnets 72, as compared to, for example, the inner restricting portions 8*e* of FIG. 1. The length of the first inclined magnets 71 and the second inclined magnets 72 can be increased by the amount corresponding to the thickness of the inner bridges 8*i* that can be reduced.

(22) The number of the independent slot 11*c* formed on each core sheet 11 is one. The independent slot 11*c* undesirably reduces the magnetic resistance of the rotor core 8 as compared to the both-side communication slots 11*d*. However, since each core sheet 11 is provided with one independent slot 11*c* in the present embodiment, the magnetic resistance of the entire rotor core 8 is increased, and the magnetic flux leakage is minimized.

(23) The core sheets 11 are laminated along the rotor axis 13 while being rotated one at a time by 360/(P/2)°, that is, by 90°. Since the rotating and laminating operation of the core sheets 11 are constant, the rotor core 8 is easily manufactured, and automation is easy. The independent slot 11*c* and the inner bridges 8*i* are provided along the rotor axis at regular intervals. In the present embodiment, three core sheets 11 are located between axially adjacent independent slots 11*c*. Thus, the inner bridges 8*i* restrict the radially inward movement of the first inclined magnets 71 and the second inclined magnets 72 evenly along the axial direction. Thus, the first inclined magnets 71 and the second inclined magnets 72 are supported in a balanced manner.

(24) The width of the inner bridges 8*i* is constant along the radial direction as viewed from the axial direction. Thus, the width of the inner bridges 8*i* is evenly reduced, thereby reducing the magnetic flux leakage.

(25) Each of the first inclined accommodating slots 81 and the associated second inclined accommodating slot 82 do not communicate with each other. That is, the inter-inclined slot bridges 8*m* extending in the radial direction is formed between each first inclined accommodating slot 81 and the associated second inclined accommodating slot 82. The wide outer bridges 8*k* are connected to the inter-inclined slot bridges 8*m*. Thus, the strength is increased and deformation is prevented in the rotor core 8 of the present embodiment as compared to a case where, for example, each first inclined accommodating slot 81 communicates with the associated second inclined accommodating slots 82.

In particular, each of the core sheets 11 before lamination might be difficult to handle since the rigidity of the core sheet 11 is reduced. For example, the rigidity of the core sheet 11 is reduced in a case where each first preformed inclined accommodating slot 61 communicates with the associated second preformed inclined accommodating slot 62. This is because the inner ring 11*s* of the core sheet 11 is connected to the outer ring 11*t* by only the inner bridges 8*i*. However, since inter-inclined slot bridges 8*m* connect the inner ring 11*s* to the outer ring 11*t* in the present embodiment, the strength of the core sheet 11 is increased, and deformation of the core sheet 11 is prevented, which facilitates handling.

FIGS. 21 to 23A show an eighth embodiment of the present invention.

Figure 21:
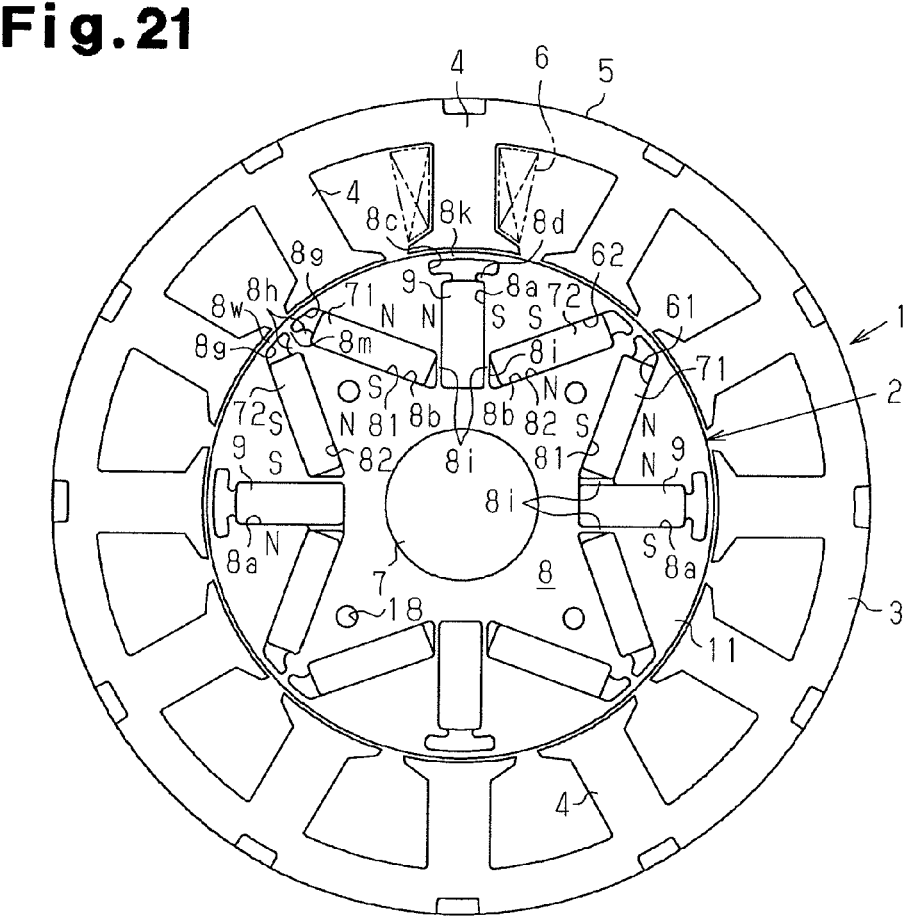
FIG. 21 is a plan view illustrating an embedded magnet motor according to an eighth embodiment.
Figure 22:
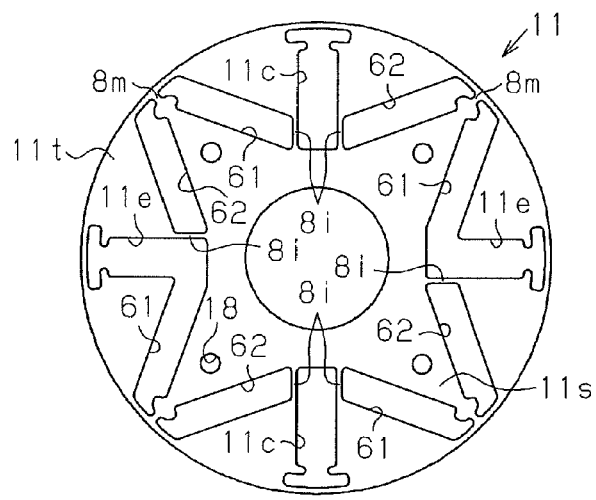
FIG. 22 is a plan view illustrating the core sheet of FIG. 21.

The core sheet 11 shown in FIG. 22 includes two first one-side communication slots 11*e* and two independent slots 11*c*. These first one-side communication slots 11*e* and the independent slots 11*c* are the preformed radial accommodating slots the number of which is four, that is, P/2. Each of the first one-side communication slots 11*e* communicates with the associated first preformed inclined accommodating slot 61, but does not communicate with the second preformed inclined accommodating slot 62. That is, the inner bridge 8*i* is formed between each first one-side communication slot 11*e* and the associated second preformed inclined accommodating slot 62. In FIG. 21, the first one-side communication slots 11*e* are located at intervals of 180°. That is, the independent slots 11*c* are also located at intervals of 180°.

Figure 23:
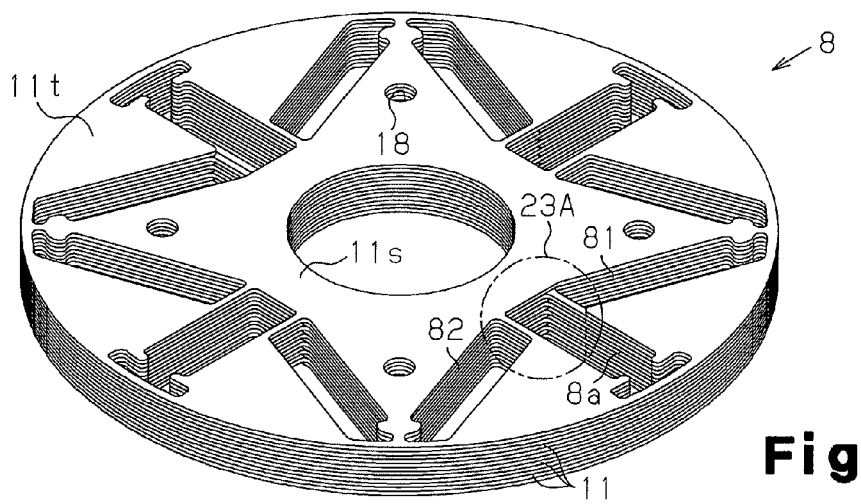
FIG. 23 is a perspective view illustrating the rotor core of FIG. 21.
Figure 23A:
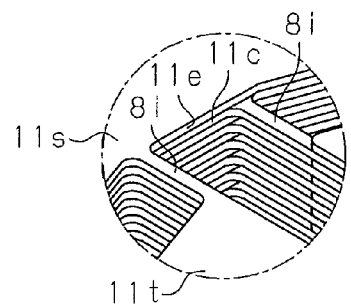
FIG. 23A is an enlarged perspective view illustrating a radially inner end of one of the radial accommodating slots of FIG. 23.

The rotor core 8 shown in FIGS. 21 and 23 is manufactured by laminating the core sheets 11 of FIG. 22 on the rotor axis 13 while rotating them by 90° one at a time.

The eighth embodiment has the following advantage.

(26) The first one-side communication slots 11*e* are arranged at least at some parts of each radial accommodating slot 8*a* along the axial direction. Thus, gaps are formed between parts of each radial accommodating slot 8*a* corresponding to the first one-side communication slots 11*e* and the radially inner end of the associated first inclined magnet 71. Thus, the magnetic resistance is increased, and the magnetic flux leakage is reduced. Forming the first one-side communication slots 11*e* by punching the core sheet 11 is easier than, for example, to form the inner restricting portions 8*e* of FIG. 1. Also, since the inner bridges 8*i* connect the inner ring 11*s* to the outer ring lit in the radial direction, the strength of each core sheet 11 is increased. By reducing the thickness of the inner bridges 8i, the length of the first inclined magnets 71 and the second inclined magnets 72 is increased.

Also, the embodiment is not limited to laminating the core sheets 11 of FIG. 22 on the rotor axis 13 while rotating the core sheets 11 one at a time, but the core sheets 11 of FIG. 22 may be laminated while rotating the core sheets 11 by 90° one at a time, and witch each core sheet 11 being turned over relative to the preceding core sheet 11. In this case, the cross-sectional areas of the inner bridges 8i on both circumferential sides of the radial accommodating slots 8a are even along the entire axial direction of the rotor core 8.

FIGS. 24 to 26A show a ninth embodiment.

Figure 25:
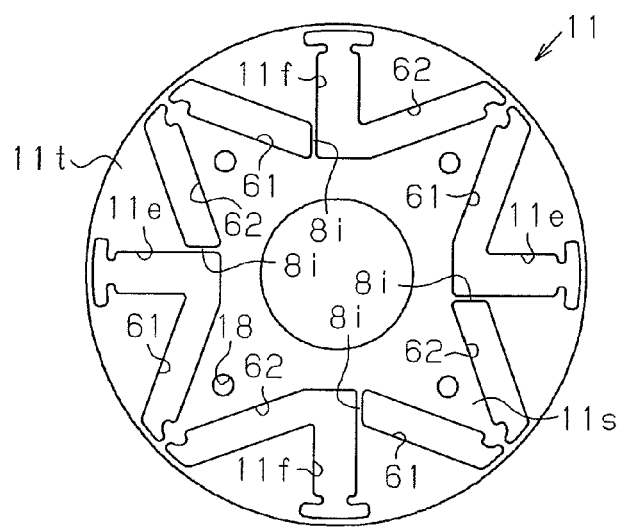
FIG. 25 is a plan view illustrating the core sheet of FIG. 24.

As shown in FIG. 25, each core sheet 11 includes two first one-side communication slots 11e and two second one-side communication slots 11f. That is, the total of four preformed radial accommodating slots of the core sheet 11 are all one-side communication slots. The second one-side communication slots 11f do not communicate with the first preformed inclined accommodating slots 61, and communicate with the second preformed inclined accommodating slots 62.

Figure 24:
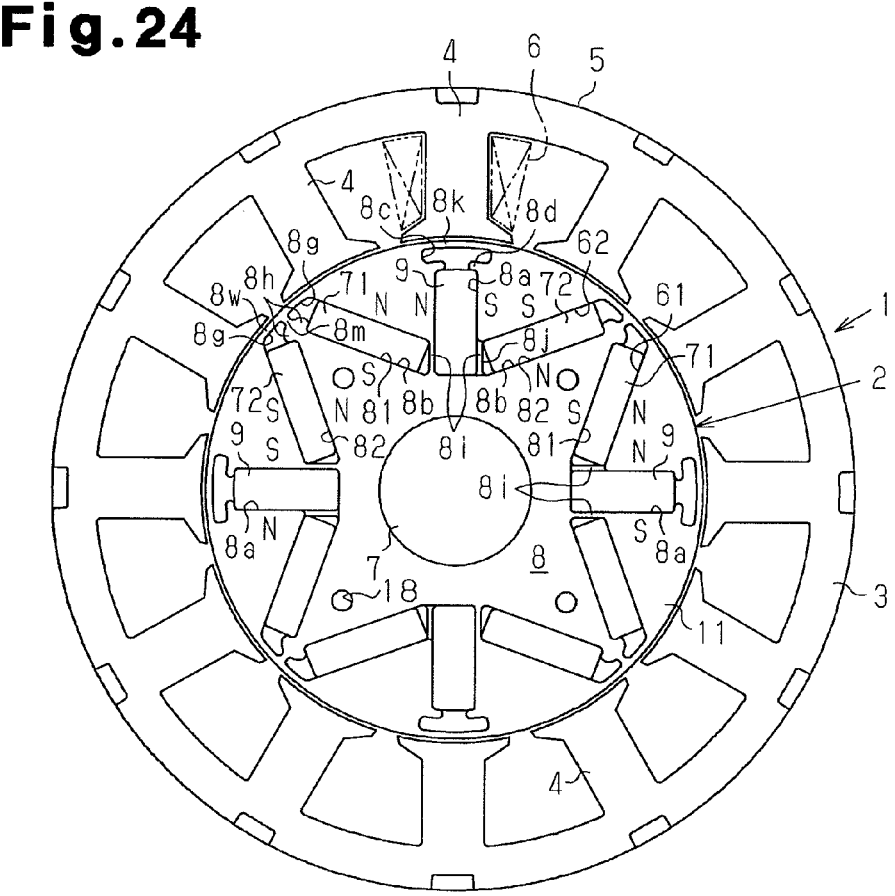
FIG. 24 is a plan view illustrating an embedded magnet motor according to a ninth embodiment.

The rotor core 8 of FIGS. 24 and 26 is formed by laminating the core sheets 11 of FIG. 25 on the rotor axis 13 while rotating them by 90° one at a time.

The ninth embodiment has the following advantages.

(27) Each of the radial accommodating slots 8a is provided with the first one-side communication slots 11e and the second one-side communication slots 11f. As a result, the inner bridges 8i restrict the first inclined magnets 71 and the second inclined magnets 72 from moving radially inward.

(28) All the preformed radial accommodating slots are either the first one-side communication slot 11e or the second one-side communication slot 11f. Thus, for example, as compared to a case where some of the preformed radial accommodating slots are the independent slots 11c, the magnetic resistance of the rotor core 8 is increased, thereby reducing the magnetic flux leakage.

The radial dimension of each of the both-side communication slots 11d, the independent slot 11c, the first one-side communication slots 11e, and the second one-side communication slots 11f does not need to be uniform. Some of the preformed radial accommodating slots may be the short slots 11a and the rest may be the long slots 11b. The short slots 11a restrict the radial magnets 9 from moving radially inward.

FIGS. 27 to 29A show a tenth embodiment.

Figure 28:
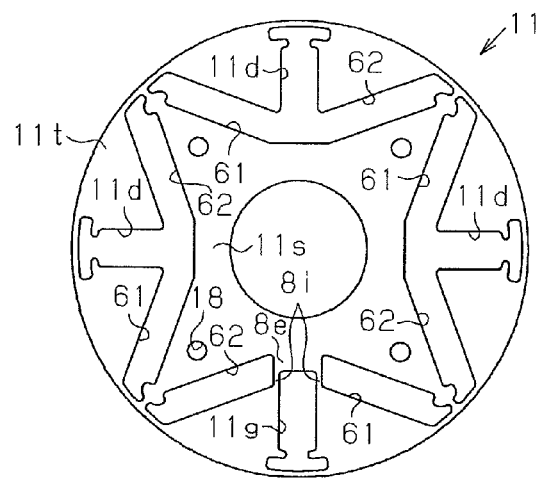
FIG. 28 is a plan view illustrating the core sheet of FIG. 27.

The core sheet 11 shown in FIG. 28 includes one short independent slot 11g. The short independent slot 11g is identical to the independent slot 11c of FIG. 19 with the radial dimension being reduced. The radial dimension of the short independent slot 11g is less than the long slots, which are the both-side communication slots 11d.

Figure 29:
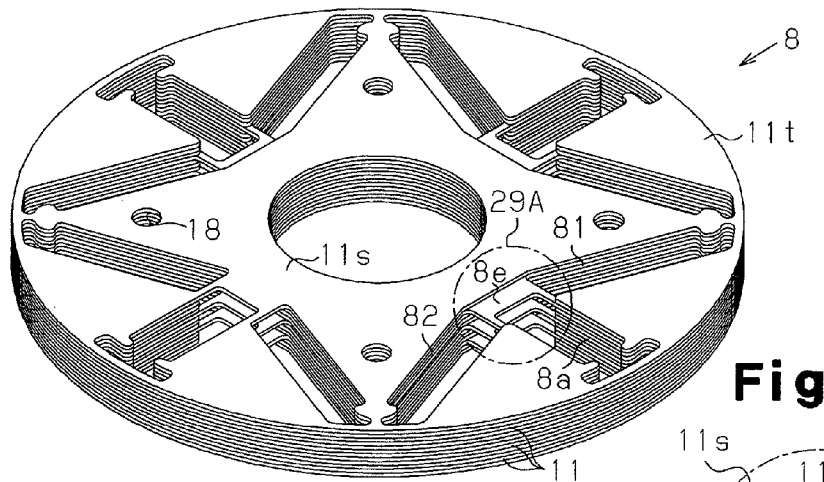
FIG. 29 is a perspective view illustrating the rotor core of FIG. 27.
Figure 29A:
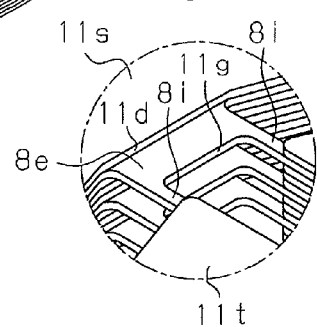
FIG. 29A is an enlarged perspective view illustrating a radially inner end of one of the radial accommodating slots of FIG. 29.

The core sheets 11 of FIG. 28 are laminated along the rotor axis 13 while being rotated by 90° one at a time. As a result, the rotor core 8 shown in FIGS. 27 and 29 is manufactured.

The tenth embodiment has the following advantage.

(29) Short slots, that is, the short independent slots 11g are arranged at some parts of each radial accommodating slot 8a along the axial direction. The short independent slots 11g form the inner restricting portions 8e. The inner restricting portions 8e restrict the radial magnets 9 from moving radially inward. Gaps are provided between the radial magnets 9 and some parts of each radial accommodating slot 8a corresponding to the long slots, that is, the both-side communication slots 11d. Thus, the magnetic resistance of the rotor core 8 is increased, thereby reducing the magnetic flux leakage.

FIGS. 30 to 32A show an eleventh embodiment.

Figure 31:
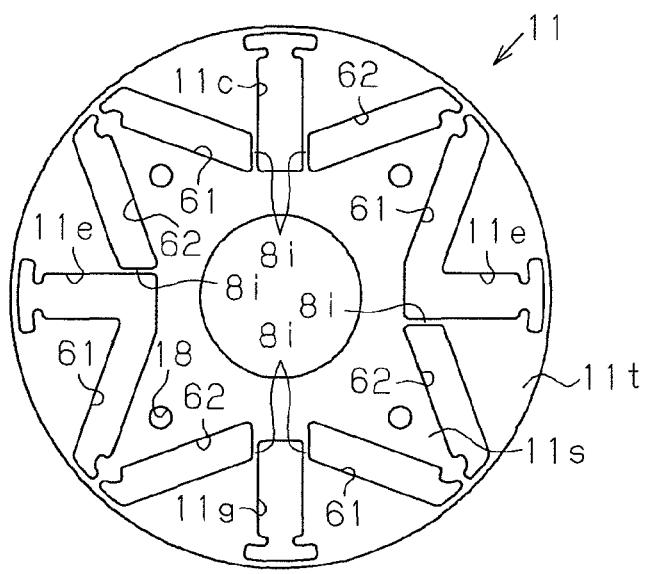
FIG. 31 is a plan view illustrating the core sheet of FIG. 30.

The core sheet 11 shown in FIG. 31 includes one short independent slot 11g, one independent slot 11c, and two first one-side communication slots 11e. That is, the core sheet 11 of FIG. 31 is identical to the core sheet 11 of FIG. 22 except that one of the independent slots 11c of the core sheet 11 of FIG. 22 is replaced with the short independent slot 11g.

Figure 30:
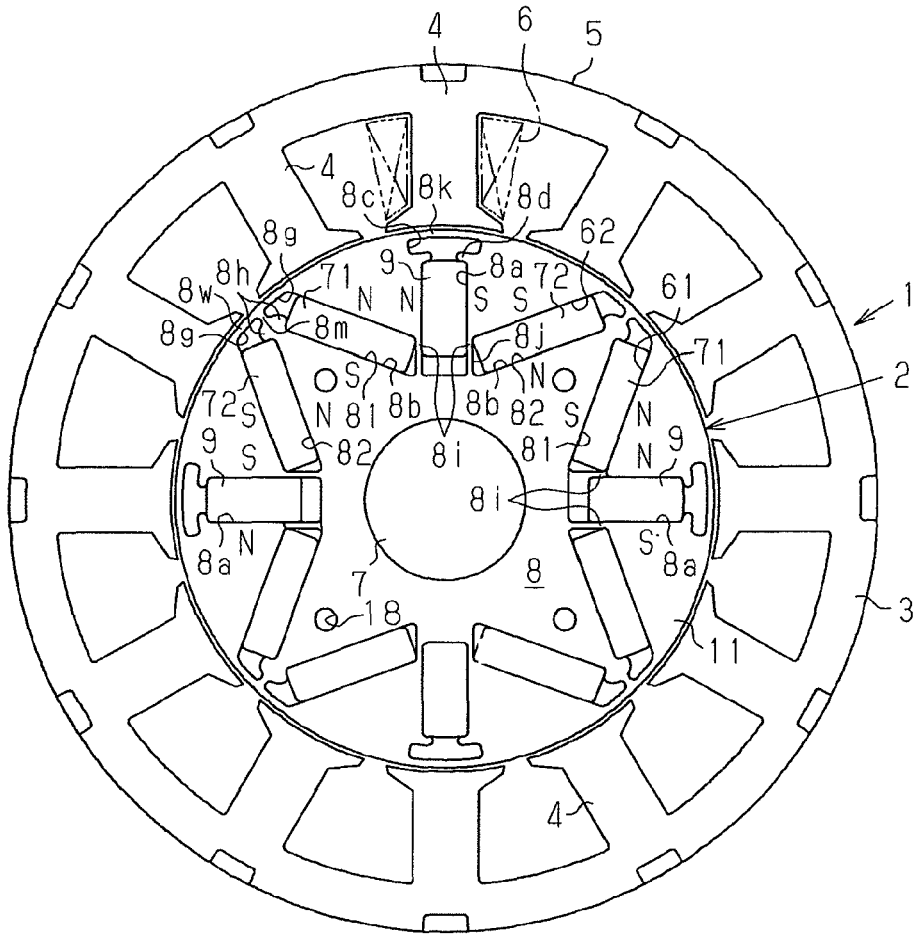
FIG. 30 is a plan view illustrating an embedded magnet motor according to an eleventh embodiment.
Figure 32:
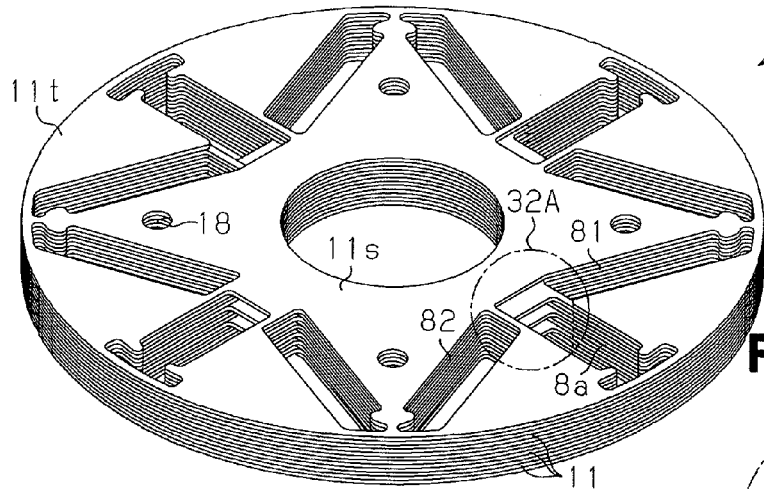
FIG. 32 is a perspective view illustrating the rotor core of FIG. 30.
Figure 32A:
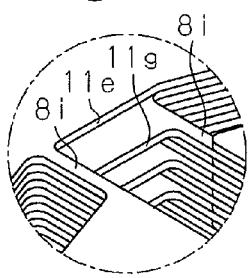
FIG. 32A is an enlarged perspective view illustrating a radially inner end of one of the radial accommodating slots of FIG. 32.

The rotor core 8 of FIGS. 30 and 32 is manufactured by laminating the core sheets 11 of FIG. 31 along the rotor axis 13 while rotating them by 90° one at a time.

Therefore, the eleventh embodiment has the advantages of FIGS. 21 to 23A and the advantages of FIGS. 27 to 29A.

Also, the core sheets 11 of FIG. 31 may be laminated witch each core sheet 11 being turned over relative the preceding core sheet 11. In this case, the cross-sectional areas of the inner bridges 8i on both circumferential sides of each radial accommodating slot 8a are even along the entire axial direction of the rotor core 8.

FIGS. 33 to 35A show a twelfth embodiment.

Figure 34:
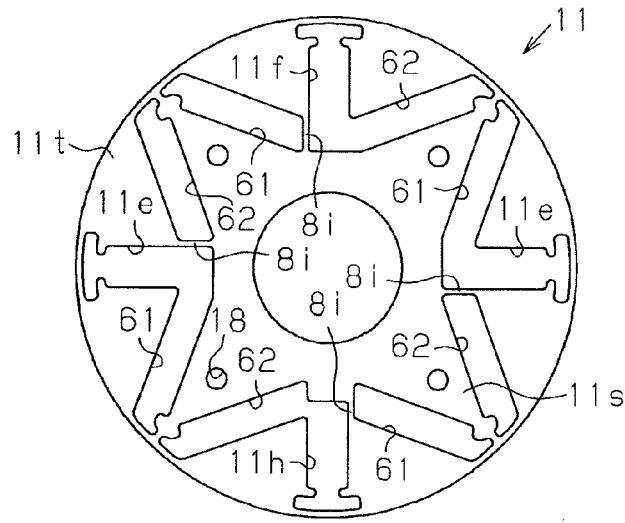
FIG. 34 is a plan view illustrating the core sheet of FIG. 33.

The core sheet 11 shown in FIG. 34 includes two first one-side communication slots 11e, one second one-side communication slot 11f, and one second one-side communication short slot 11h. That is, the core sheet 11 of FIG. 34 is identical to the core sheet 11 of FIG. 25 except that one of the second one-side communication slots 11f of the core sheet 11 of FIG. 25 is replaced with the short slot, which is the second one-side communication short slot 11h.

Figure 33:
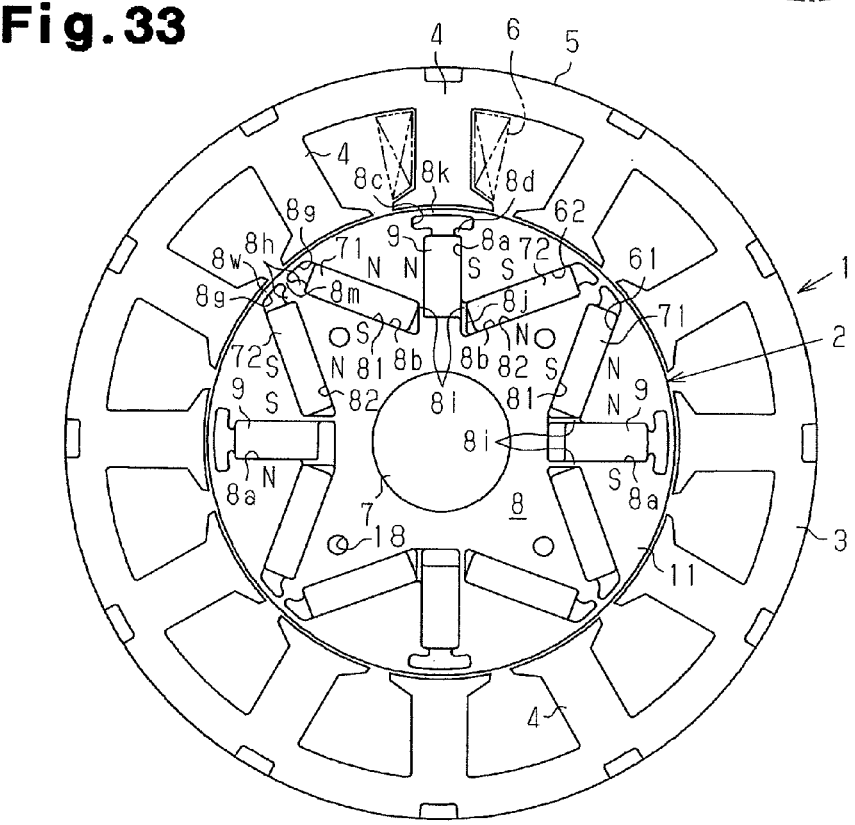
FIG. 33 is a plan view illustrating an embedded magnet motor according to a twelfth embodiment.
Figure 35:
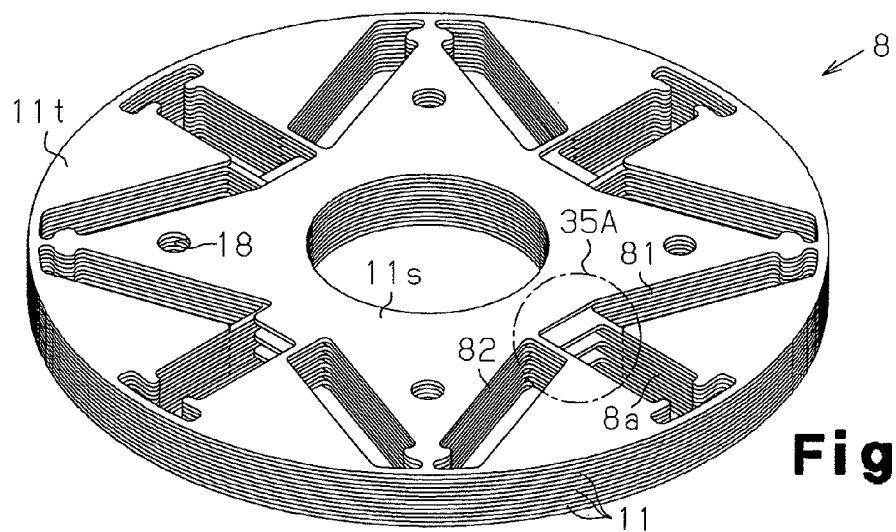
FIG. 35 is a perspective view illustrating the rotor core of FIG. 33.
Figure 35A:
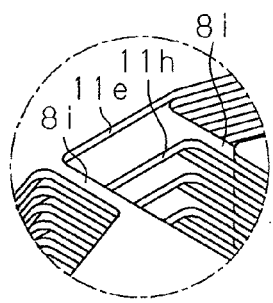
FIG. 35A is an enlarged perspective view illustrating a radially inner end of one of the radial accommodating slots of FIG. 35.

The rotor core 8 of FIGS. 33 and 35 is manufactured by laminating the core sheets 11 of FIG. 34 along the rotor axis 13 while rotating them by 90° one at a time.

Therefore, the twelfth embodiment has both of the advantages of FIGS. 24 to 26A and the advantages of FIGS. 27 to 29A.

FIGS. 36 to 38A show a thirteenth embodiment.

Figure 37:
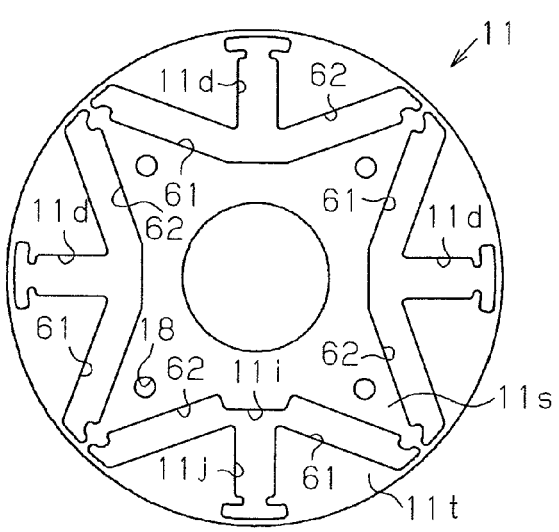
FIG. 37 is a plan view illustrating the core sheet of FIG. 36.

The core sheet 11 shown in FIG. 37 includes one projecting communication slot 11j and three both-side communication slots 11d. That is, the core sheet 11 of FIG. 37 is identical to the core sheet 11 of FIG. 19 except that one independent slot 11c of the core sheet 11 of FIG. 19 is replaced with the projecting communication slot 11j. A substantially trapezoidal restricting projection 11i is formed on the radially inner end of the projecting communication slot 11j. The radially inner end of the projecting communication slot 11j communicates with the circumferentially adjacent first preformed inclined accommodating slot 61 and the second preformed inclined accommodating slot 62. The restricting projection 11i restricts each radial magnet 9 from moving radially inward. The inclined surfaces of the trapezoidal shape of the restricting projection 11i abut against the associated first inclined magnet 71 and the second inclined magnet 72 at a position where the first inclined magnet 71 and the second inclined magnet 72 do not contact the radial magnet 9. As a result, the restricting projection 11i restricts the associated first inclined magnet 71 and the second inclined magnet 72 from moving radially inward. That is, the restricting projection 11i is not in point contact with but in line contact with the radial magnet 9, the first inclined magnet 71, and the second inclined magnet 72 as viewed from the axial direction. The width of the restricting projection 11i is set greater than the width of the projecting communication slot 11j.

Figure 36:
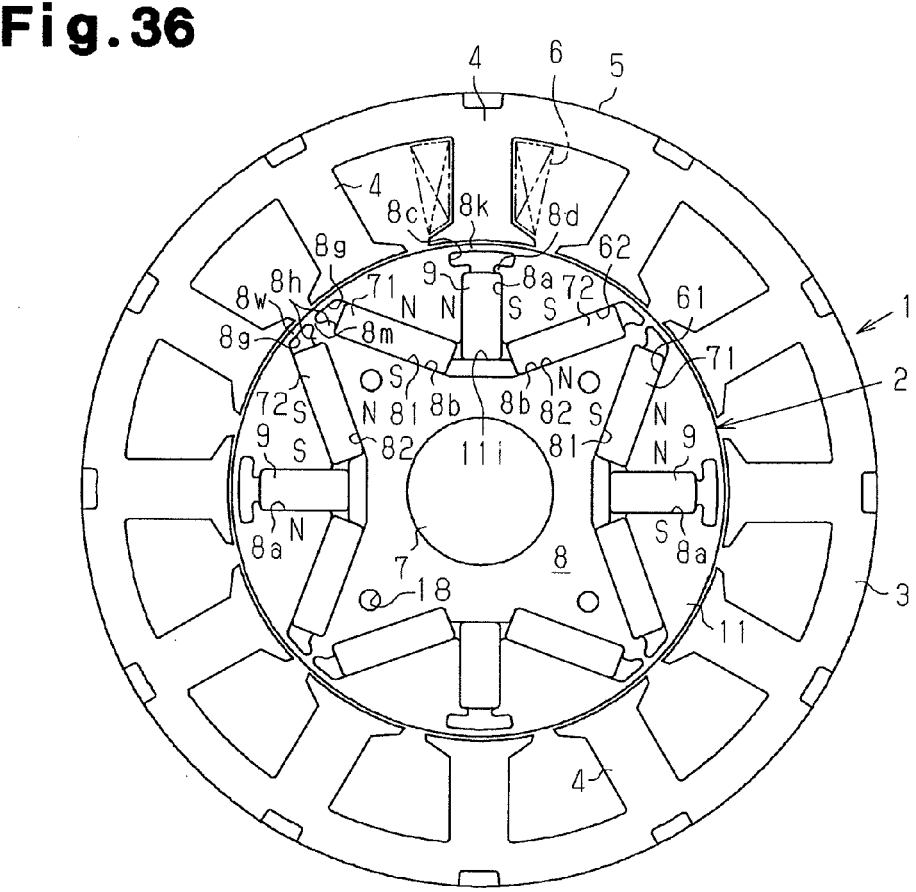
FIG. 36 is a plan view illustrating an embedded magnet motor according to a thirteenth embodiment.
Figure 38:
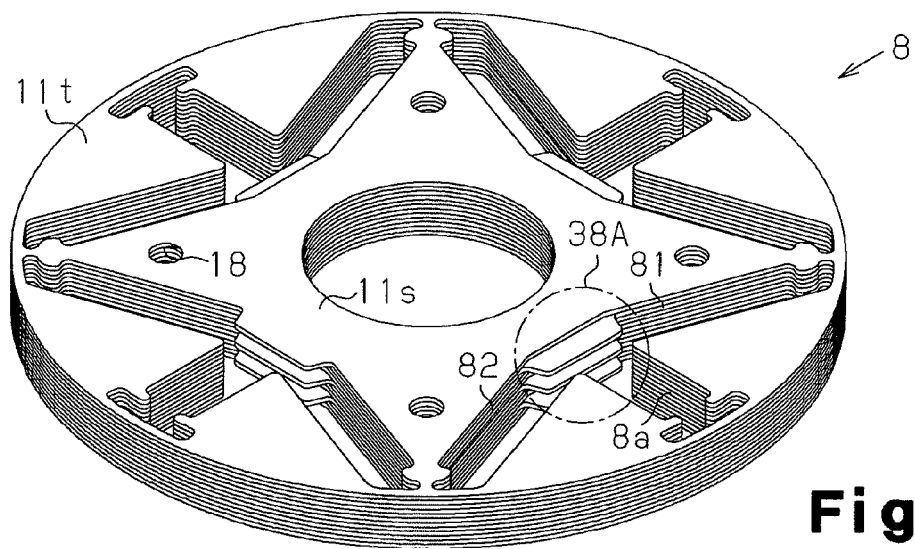
FIG. 38 is a perspective view illustrating the rotor core of FIG. 36.
Figure 38A:
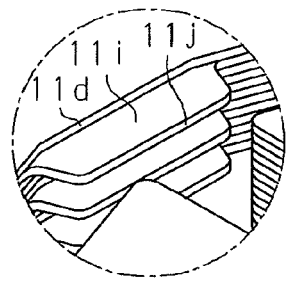
FIG. 38A is an enlarged perspective view illustrating a radially inner end of one of the radial accommodating slots of FIG. 38.

The rotor core 8 of FIGS. 36 and 38 is manufactured by laminating the core sheets 11 of FIG. 37 along the rotor axis 13 while rotating them by 90° one at a time.

The thirteenth embodiment has the following advantages.

(30) The projecting communication slot 11j provided with the restricting projection 11i is arranged at some parts of each radial accommodating slot 8a along the axial direction. The restricting projections 11i restrict the associated radial magnet 9, the first inclined magnet 71, and the second inclined magnet 72 from moving radially inward, and form a gap between the radial magnet 9 and the first inclined magnet 71. Furthermore, the restricting projections 11i form a gap between the second inclined magnet 72 and the radial magnet 9. That is, the restricting projections 11i omit the inner bridges 8i. Thus, the magnetic resistance of the rotor core 8 is increased, thereby reducing the magnetic flux leakage.

(31) Forming the projecting communication slot 11j by punching each core sheet 11 is easier as compared to, for example, forming small projections that restrict radially inward movement of the radial magnets 9, the first inclined magnets 71, and the second inclined magnets 72.

(32) The core sheet 11 of FIG. 37 includes one projecting communication slot 11j, and the rest of the preformed radial accommodating slots are the both-side communication slots 11d. Thus, the magnetic flux leakage is reduced as compared to, for example, a case where the core sheet 11 includes two or more projecting communication slots 11j, or a case where each core sheet 11 includes the independent slots 11c instead of the both-side communication slots 11d.

FIGS. 39 to 42 show a fourteenth embodiment.

Figure 40A:
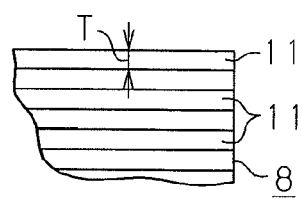
FIG. 40A is a partial side view illustrating the laminated core sheets of FIG. 39.
Figure 40B:
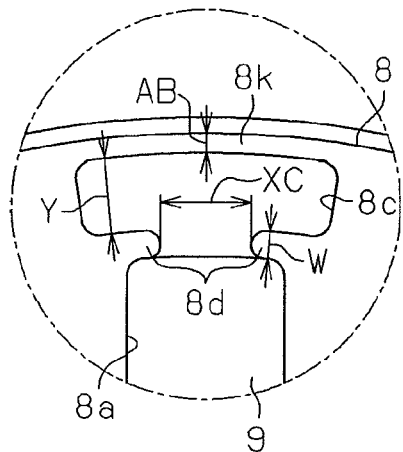
FIG. 40B is an enlarged plan view illustrating one of the wide slots of FIG. 29.

As shown in FIG. 40A, the thickness of each core sheet 11 is referred to as a core sheet thickness T. As shown in FIG. 40B, the radial dimension of each wide slot 8c is referred to as a wide radial dimension Y. The wide radial dimension Y is set equal to 4T (Y=4T) so as to satisfy Y≦4T. In the present embodiment, the core sheet thickness T is set equal to 0.4 mm, and the wide radial dimension Y is set equal to 1.6 mm.

As shown in FIG. 40B, the circumferential spacing between each pair of outer circumferential projections 8d is referred to as a constriction spacing XC of each radial accommodating slot 8a.

As shown in FIG. 40B, the radial dimension of each wide outer bridge 8k is referred to an outer bridge dimension AB. The radial dimension of the outer circumferential projections 8d is referred to as a projection radial dimension W.

Figure 40C:
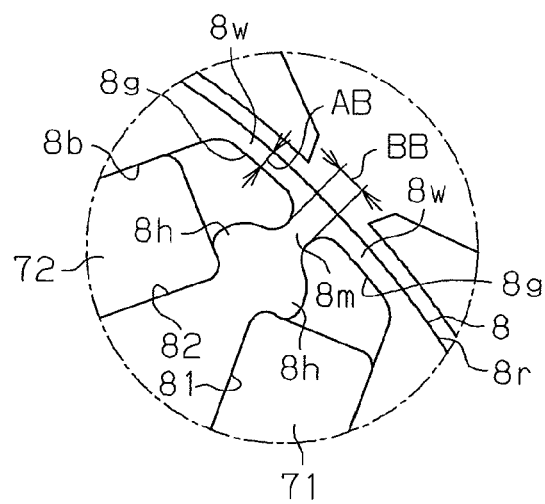
FIG. 40C is an enlarged plan view illustrating a radially outer end of one of the V-shaped accommodating slots of FIG. 29.

As shown in FIG. 40C, the radial dimension of each V-slot outer bridge 8w is also set equal to the outer bridge dimension AB. In the present embodiment, the outer bridge dimension AB is set to 0.4 mm. That is, the outer bridge dimension AB is set equal to the core sheet thickness T (AB=T).

The circumferential dimension of each inter-inclined slot bridge 8m is referred to as an inter-inclined slot bridge dimension BB. The inter-inclined slot bridge dimension BB is set greater than the outer bridge dimension AB (BB>AB). In the present embodiment, the inter-inclined slot bridge dimension BB is set to 0.6 mm.

Figure 40D:
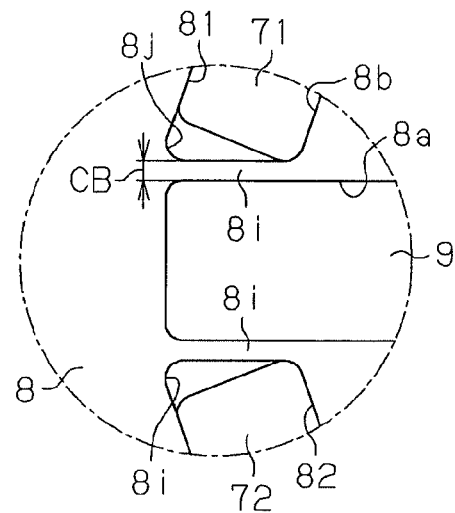
FIG. 40D is an enlarged plan view illustrating a radially inner end of one of the V-shaped accommodating slots of FIG. 29.

As shown in FIG. 40D, the width of the inner bridges 8i is referred to as an inner bridge dimension CB. The inter-inclined slot bridge dimension BB is set greater than the inner bridge dimension CB (BB>CB). In the present embodiment, the inner bridge dimension CB is set equal to 0.4 mm (AB=CB=T).

The fourteenth embodiment has the following advantage.

(33) The wide slots 8c increase the magnetic resistance at the radially outer ends of the radial accommodating slots 8a, and separate the magnetic paths from the radial magnets 9, thereby reducing the magnetic flux leakage of the rotor core 8.

Figure 41:
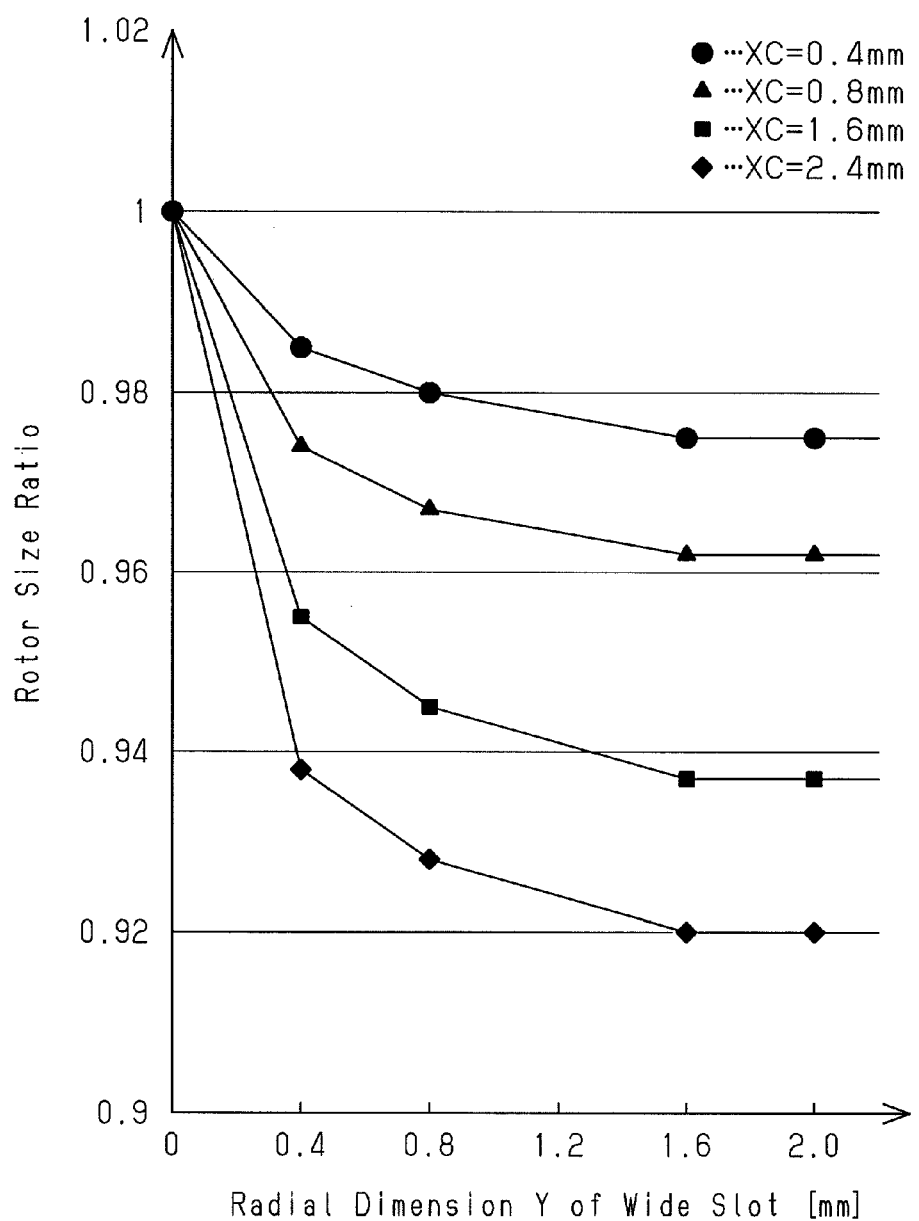
FIG. 41 is a characteristic diagram between the radial dimension of the wide slots and the rotor size ratio.

Based on the experimental result of FIG. 41, setting is performed to satisfy Y≦4T (Y≦1.6 mm). Thus, the strength of the outer circumferential projections 8d is achieved without excessively increasing the wide radial dimension Y of the wide slots 8c. This achieves the strength of the outer circumferential projections 8d necessary to restrict the radial magnets 9 from moving radially outward. That is, the size of the rotor 2 is reduced without reducing the projection radial dimension W of the outer circumferential projections 8d more than necessary. The wide slots 8c efficiently reduce the magnetic flux leakage, and the size of the rotor 2 is reduced.

FIG. 41 shows the experimental result of the relationship between changes in the wide radial dimension Y and the size ratio of the rotor 2 necessary to obtain the torque property of a predetermined value. In the experiment, the diameter of the rotor 2, that is, the diameter of the rotor core 8 was fixed, the outer bridge dimension AB was fixed, and the size of the radial magnets 9 and the radial position of the radial magnets 9 were fixed. That is, the size ratio of the rotor represents the axial dimension ratio of the rotor 2, that is, the axial dimension ratio of the rotor core 8. The predetermined value of the torque property was set to the torque property of the rotor core 8 when the wide slots 8c were not provided. The rotor size ratio required to obtain the predetermined value of the torque property was measured for each of the cases where the constriction spacing XC was set equal to 0.4 mm, 0.8 mm, 1.6 mm, and 2.4 mm. As is mentioned in the description of the fourteenth embodiment, AB=T=CB=0.4 mm.

As shown in FIG. 41, as the constriction spacing XC is increased, the size of the rotor 2 was reduced. This is because as the constriction spacing XC was increased, the magnetic flux leakage of the rotor core 8 was reduced. According to FIG. 41, in the cases of any constriction spacing XC, the size of the rotor 2 is reduced until the wide radial dimension Y reaches 4T (1.6 mm) from zero. However, even if the wide radial dimension Y is set greater than 4T, the size of the rotor 2 cannot be made smaller than the case where Y is equal to 4T (Y=4T).

Thus, according to FIG. 41, when the wide radial dimension Y is set greater than 4T, the strength of the rotor core 8 is unnecessarily reduced. This also causes the need for reducing the projection radial dimension W of the outer circumferential projections 8d, which might reduce the strength of the outer circumferential projections 8d.

However, in the present embodiment, Y is set less than or equal to 4T (Y≦4T). Thus, the size of the rotor 2 is reduced without unnecessarily reducing the strength of the outer circumferential projections 8d. For example, when the strength of the outer circumferential projections 8d is low, the radial magnets 9 might damage the outer circumferential projections 8d by the centrifugal force caused by rotation of the rotor 2. That is, the radial magnets 9 might move radially outward.

However, the present embodiment achieves the strength of the outer circumferential projections 8d. As a result, the size of the rotor 2 is reduced while preventing the displacement of the radial magnets 9. That is, the present embodiment finely optimizes the shape and dimension of the wide slots 8c. The present embodiment provides the dimension of the wide slots 8c for effectively reducing the magnetic flux leakage. As a result, the size of the motor is reduced.

(34) Setting is performed to satisfy Y=4T (Y=1.6 mm). Thus, the size of the rotor 2 is minimized without unnecessarily reducing the strength of the outer circumferential projections 8d (see FIG. 41).

(35) The outer bridge dimension AB and the inter-inclined slot bridge dimension BB are set to satisfy BB>AB. As apparent from the experimental result of FIG. 42, the present embodiment reduces the magnetic flux leakage as in the case where BB is set equal to AB (BB=AB), and the size of the rotor 2 is reduced. The present embodiment achieves the strength of the inter-inclined slot bridges 8m, and achieves the strength of the rotor core 8 as compared to, for example, the case where BB is set equal to AB (BB=AB).

Figure 42:
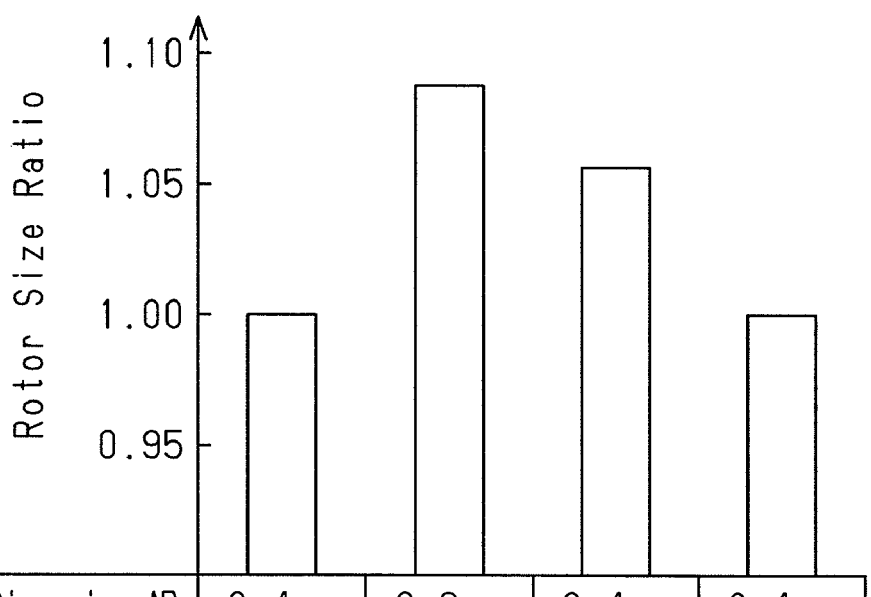
FIG. 42 is a graph showing the rotor size ratio.

FIG. 42 shows the experimental result of the size ratio of the rotor 2 required to obtain the torque property of the predetermined value when the outer bridge dimension AB, the inter-inclined slot bridge dimension BB, and the inner bridge dimension CB are varied. As a reference value, the rotor size ratio in the case where AB=BB=CB=0.4 mm is referred to as one (the rotor size ratio=1). The rotor size ratio was obtained by setting each of the outer bridge dimension AB, the inter-inclined slot bridge dimension BB, and the inner bridge dimension CB to 0.6 mm. When only the outer bridge dimension AB was 0.6 mm, the rotor size ratio was approximately 1.09. When only the inter-inclined slot bridge dimension BB was 0.6 mm, the rotor size ratio was approximately 1.06. When only the inner bridge dimension CB was 0.6 mm, the rotor size ratio was approximately 1.00.

As shown in FIG. 42, the rotor size ratio obtained when BB is equal to 0.6 mm is almost equal to 1.00. That is, even if the inter-inclined slot bridge dimension BB is set greater than the outer bridge dimension AB (BB>AB), the rotor size ratio does not change much from the case when BB is equal to AB when the inner bridge dimension CB is fixed. Thus, when BB is greater than AB (BB>AB), the size of the rotor 2 is reduced as in the case where BB is equal to AB (BB=AB). That is, when BB is greater than AB (BB>AB), the strength of the inter-inclined slot bridges 8m is achieved as compared to the case where BB is equal to AB (BB=AB). That is, by setting the inter-inclined slot bridge dimension BB to be greater than the outer bridge dimension AB, the strength of the rotor core 8 is increased while maintaining the torque property.

(36) The inner bridge dimension CB and the inter-inclined slot bridge dimension BB are set such that BB is greater than CB (BB>CB). As apparent from FIG. 42, the magnetic flux leakage is reduced, and the size of the rotor 2 is reduced as in the case when BB is equal to CB (BB=CB). Furthermore, when BB is greater than CB (BB>CB), the strength of the inter-inclined slot bridges 8m is increased than the case when BB is equal to CB (BB=CB).

As shown in FIG. 42, when the outer bridge dimension AB is fixed, even if the inter-inclined slot bridge dimension BB is set to 0.6 mm, which is greater than the inner bridge dimension CB, the rotor size ratio does not become greater than the case where BB=CB=0.4 mm. Thus, by setting the inter-inclined slot bridge dimension BB to be greater than the inner bridge dimension CB, the size of the rotor 2 is reduced as in the case where BB is equal to CB (BB=CB). Furthermore, the strength of the inter-inclined slot bridges 8m is increased, thus increasing the strength of the rotor core 8.

(37) The outer bridge dimension AB is set equal to T (AB=T). Thus, the cross-section of the wide outer bridge 8k and the V-slot outer bridge 8w in each core sheet 11 is square. Thus, the present embodiment increases the strength of the wide outer bridges 8k and the V-slot outer bridges 8w while reducing the magnetic flux leakage of the wide outer bridges 8k and the V-slot outer bridges 8w as compared to, for example, a case where AB is not equal to T.

FIGS. 43 to 48 show a fifteenth embodiment.

Figure 43:
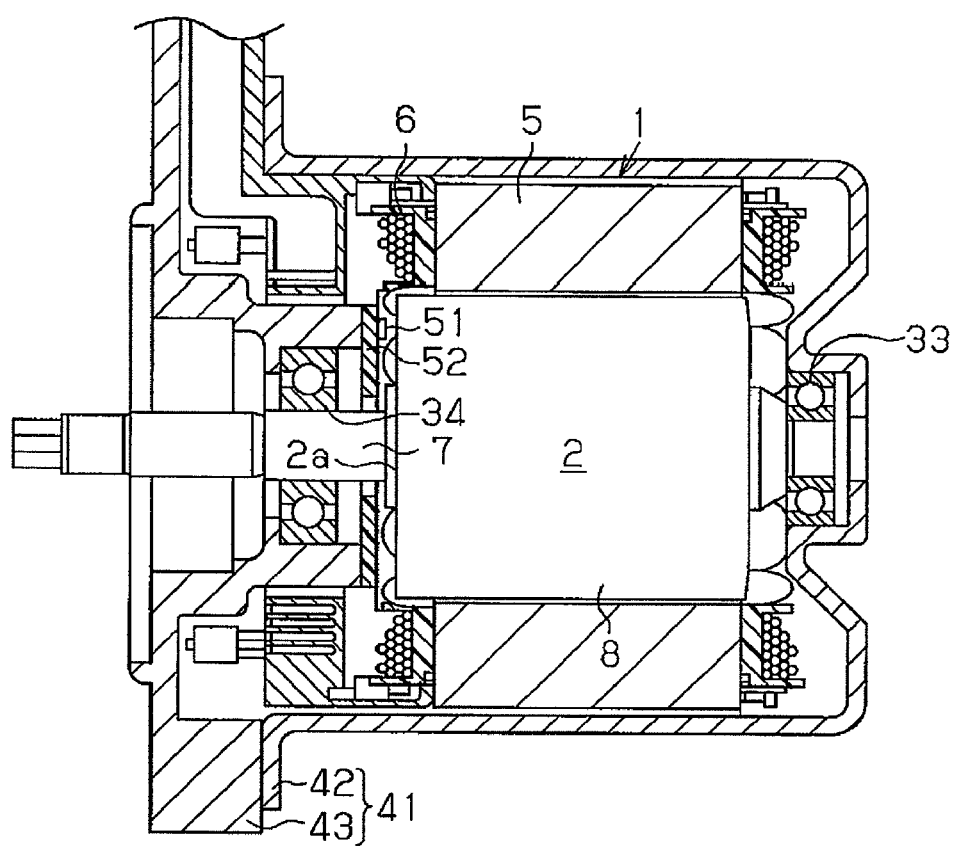
FIG. 43 is a cross-sectional view illustrating an embedded magnet motor according to a fifteenth embodiment.

As shown in FIG. 43, the embedded magnet motor includes a motor case 41, which accommodates the stator 1. The motor case 41 includes a yoke 42 and an end plate 43. The yoke 42 is a cylinder having a bottom. The end plate 43 closes the opening of the yoke 42. The stator 1 is secured to the inner circumferential surface of the yoke 42.

A first bearing 33 is arranged at the bottom portion of the yoke 42. A second bearing 34 is arranged at the center of the end plate 43. The first bearing 33 and the second bearing 34 rotatably support the rotating shaft 7.

As shown in FIG. 43, a Hall IC 51 is arranged on the end plate 43 via a substrate 52. The Hall IC 51 is a magnetic sensor, which detects rotation of the rotor 2 by detecting the magnetic flux leakage of the rotor 2 in the axial direction. That is, the Hall IC 51 detects the rotation position of the rotor 2, that is, the rotational angle. The Hall IC 51 faces an axial end surface 2a of the rotor 2. Based on signals from the Hall IC 51, a controller (not shown) generates optimal rotating magnetic field from the stator 1, and as a result, reliably rotates the rotor 2.

Figure 44:
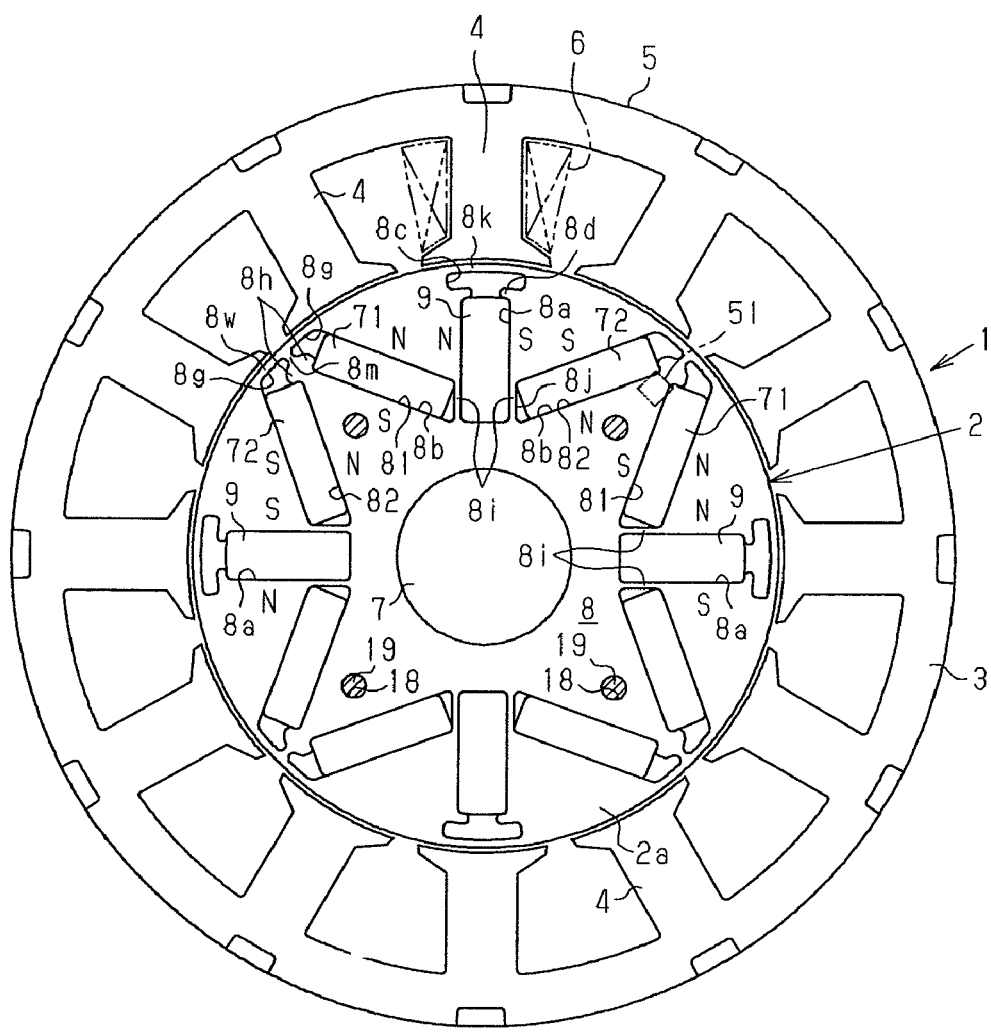
FIG. 44 is a plan view illustrating the rotor and the stator of FIG. 43, and shows the inside of the yoke.
Figure 45:
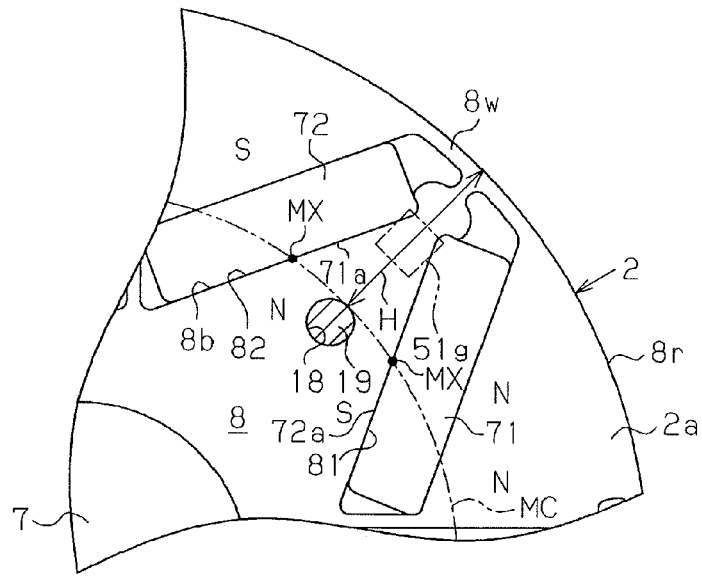
FIG. 45 is an enlarged plan view illustrating one of the V-shaped accommodating slots of FIG. 44.

As shown in FIGS. 44 and 45, the Hall IC 51 is arranged radially outward than the fastening slot 18 located between one of the first inclined magnets 71 and the associated second inclined magnet 72. The Hall IC 51 is arranged in a radially outer region H of the rotor core 8. The positive and negative poles of the magnetic flux detected in the radially outer region H are reversed only once per cycle of rotation of the rotor 2.

The side surfaces of the first inclined magnet 71 and the second inclined magnet 72 facing each other are referred to as inclined magnet surfaces 71a, 72a. As viewed from the axial direction, the centers of the inclined magnet surfaces 71a, 72a are referred to as center points MX. In the present embodiment, the radially outer region H is located radially outward than the center points MX. That is, the radially outer region H is a region between the center points MX and the rotor outer circumferential surface 8r.

The radially outer region H refers to a region of the rotor core 8 between each first inclined magnet 71 and the associated second inclined magnet 72 where the magnetic flux density is high when electric power is not supplied to the coils 6. That is, the radially outer region H is a high magnetic flux density region of the rotor core 8 when electric power is not supplied to the motor. The radially outer region H corresponds to a region of the rotor core 8 that reaches magnetic saturation (based on an experimental result, which is not shown). That is, the radially outer region H is a magnetic saturation region of the rotor core 8.

Figure 46:
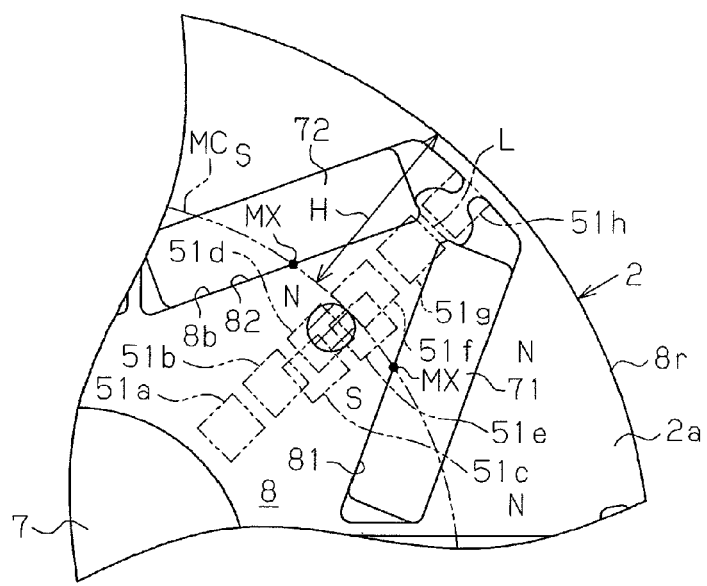
FIG. 46 is an enlarged plan view explaining a measuring step for selecting the position of the Hall IC in FIG. 45.
Figure 47:
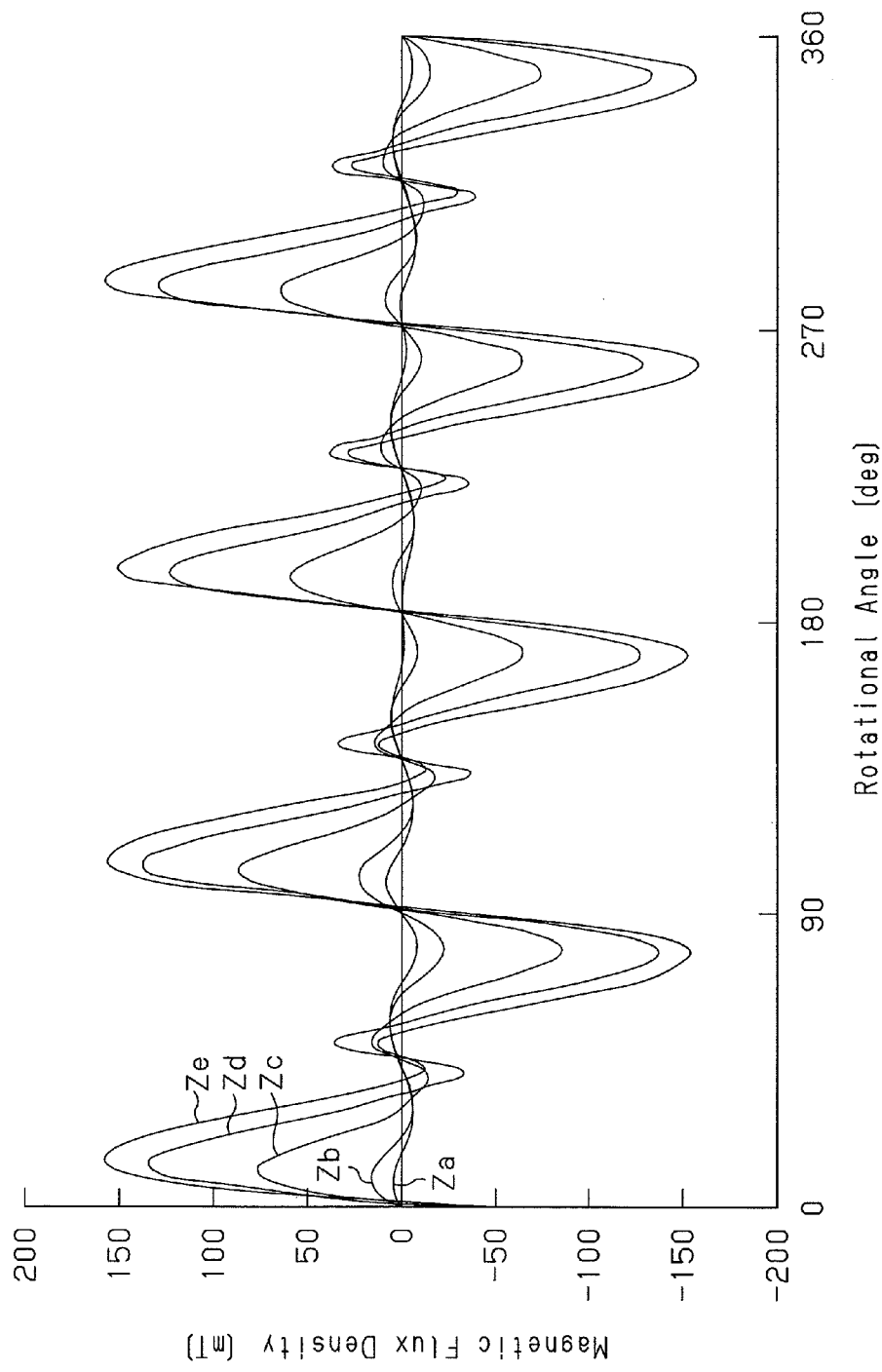
FIG. 47 is a characteristic diagram between rotational angle and magnetic flux density showing characteristic lines Za to Ze corresponding to Hall ICs 51a to 51e of FIG. 46.
Figure 48:
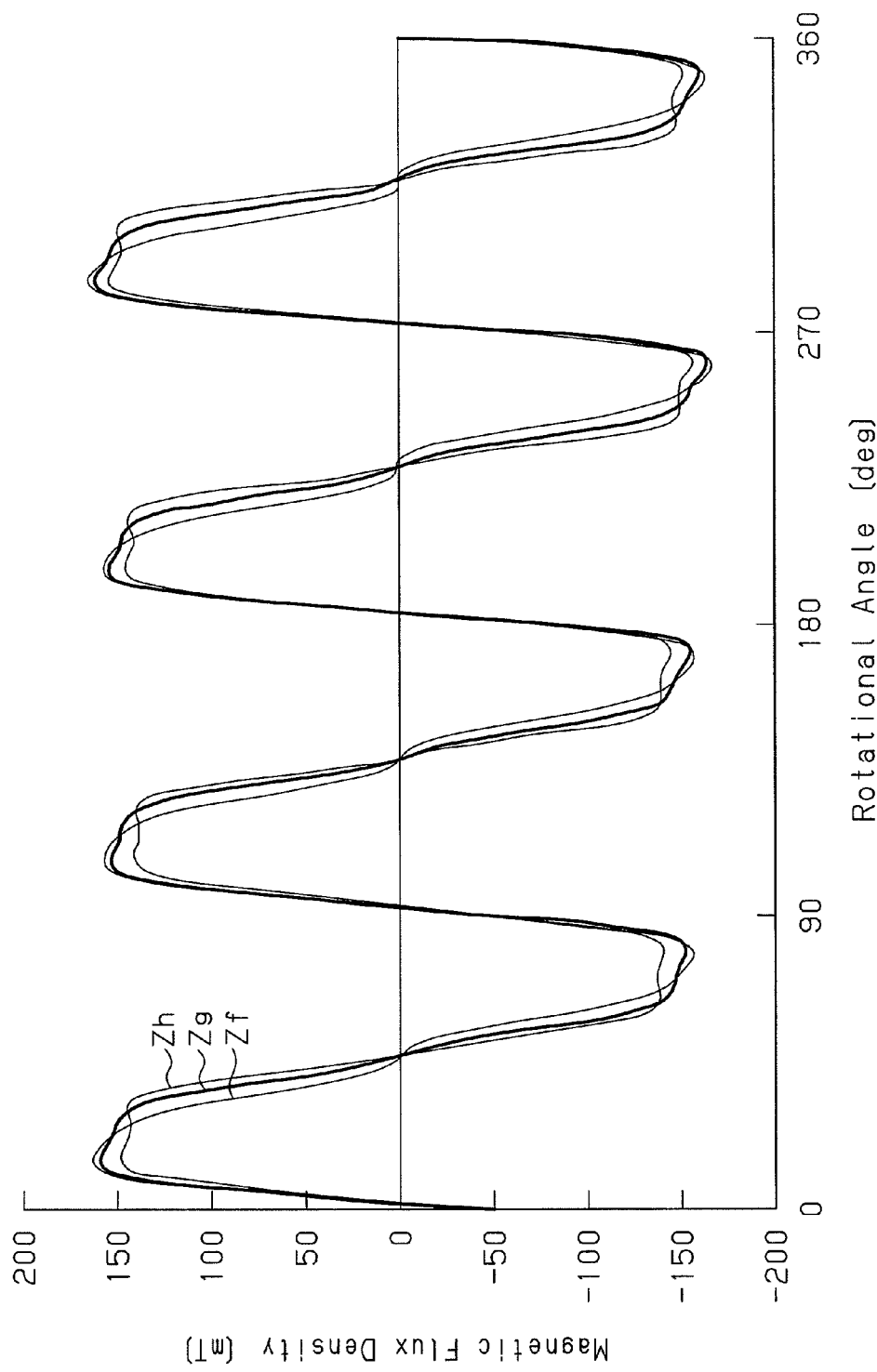
FIG. 48 is a characteristic diagram between rotational angle and magnetic flux density showing characteristic lines Zf to Zh corresponding to Hall ICs 51f to 51h of FIG. 46.

FIGS. 46 to 48 explain a designing method of the embedded magnet motor for determining the radial position of the Hall IC 51. The designing method includes a measuring step S1 and a positioning step S2. That is, the designing method is a manufacturing method of the embedded magnet motor.

First, in the measuring step S1, the position of the Hall IC 51 is determined to face the axial end surface 2a of the rotor 2. Furthermore, while changing the radial position of the Hall IC 51, the magnetic flux characteristics of each radial position is measured. As shown in FIG. 46, the positions of a first Hall IC 51a to an eighth Hall IC 51h are set from an inner circumferential surface 8v of the rotor 2 to the rotor outer circumferential surface 8r. FIG. 47 shows a first magnetic flux density characteristic Za to a fifth magnetic flux density characteristic Ze of the first Hall IC 51a to the fifth Hall IC 51e in relation to the rotational angle of the rotor core 8. FIG. 48 shows a sixth magnetic flux density characteristic Zf to an eighth magnetic flux density characteristic Zh of the sixth Hall IC 51f to the eighth Hall IC 51h.

As shown in FIG. 47, the first magnetic flux density characteristic Za to the fifth magnetic flux density characteristic Ze pass a point where the magnetic flux density is equal to zero several times during one cycle of the magnetic flux variation. That is, several zero crossings occur during one cycle of the magnetic flux variation. That is, the positive and negative signs of the magnetic flux density are reversed several times. The reversion of the positive and negative poles of the magnetic flux is detected at each of the north pole and the south pole of the rotor 2. One cycle of the magnetic flux variation is a period during which the rotor 2 is rotated by 90°, that is, a period during which the pair of the first inclined magnet 71 and the second inclined magnet 72 pass the Hall IC 51. That is, one cycle of the magnetic flux variation is a period between the pair of first inclined magnet 71 and the second inclined magnet 72. For example, the fourth magnetic flux density characteristic Zd is increased from zero (the magnetic flux density=0) to approximately 130 mT, and then reduced to approximately −30 mT. Then, after being increased to approximately 30 mT, the fourth magnetic flux density characteristic Zd is reduced to approximately −150 mT, and then becomes zero (magnetic flux density=0). That is, the fourth magnetic flux density characteristic Zd cause three zero crossings during one cycle.

As shown in FIG. 48, the sixth magnetic flux density characteristic Zf to the eighth magnetic flux density characteristic Zh pass a point where the magnetic flux density is equal to zero only once during one cycle of the magnetic flux variation. That is, zero crossing occurs only once. That is, the positive and negative poles of the magnetic flux detected between the first inclined magnet 71 and the second inclined magnet 72 is reversed only once during one cycle.

In the position determining step S2, the radially outer region H is specified, and the position of the Hall IC 51 is determined in the radially outer region H based on the result of the measuring step S1. The sixth magnetic flux density characteristic Zf to the eighth magnetic flux density characteristic Zh, in which the positive and negative poles of the magnetic flux are reversed only once during one cycle of the magnetic flux variation, are specified as shown in FIG. 48. As a result, the radial positions of the sixth Hall IC 51f to the eighth Hall IC 51h shown in FIG. 46 are specified as the radially outer region H.

As shown in FIG. 45, in the present embodiment, the Hall IC 51 is arranged at the position of the seventh Hall IC 51g corresponding to the seventh magnetic flux density characteristic Zg. As shown in FIG. 46, a line that connects points on the first inclined magnet 71 and the second inclined magnet 72 that are the closest to each other is referred to as a narrowest line L. The seventh Hall IC 51g is located immediately radially inward of the narrowest line L.

As shown in FIG. 45, the fastening slot 18 and the rivet 19 are arranged to be adjacent to and radially inward of the radially outer region H. In FIG. 45, a middle circle MC, which is a circle that passes through the center point MX of the first inclined magnet 71 and the center point MX of the second inclined magnet 72, is shown by a chain-double dashed line around the rotor axis 13. The fastening slot 18 is arranged radially inward of the middle circle MC. The distance between the seventh Hall IC 51g and the fastening slot 18 is greater than the size of the sixth Hall IC 51f.

The fifteenth embodiment has the following advantage.

(38) The Hall IC 51 is arranged to face the axial end surface 2a of the rotor 2. The Hall IC 51 is arranged in the radially outer region H. The positive and negative poles of the magnetic flux detected by the Hall IC 51 are reversed only once during one cycle of the magnetic flux variation between the first inclined magnet 71 and the second inclined magnet 72 in the radially outer region H. That is, the detected magnetic flux density undergoes zero crossing only once during one cycle of the magnetic flux variation. Thus, the present embodiment detects the rotation position of the rotor 2 highly accurately with a simple structure without using a resolver or a sensor magnet.

That is, the present embodiment eliminates the necessity of an expensive resolver that has a complicated structure. Also, the present embodiment uses the magnetic flux of the radial magnets 9, the first inclined magnets 71, and the second inclined magnets 72, which configure the magnetic poles of the rotor 2. Thus, an additional sensor magnet is not used. Therefore, the present embodiment reduces the number of components and the size, and has a simple structure. That is, the present embodiment does not require a sensor rotor of a resolver, and it is also not necessary to determine the position of the sensor magnet on the rotor with high accuracy.

As shown in FIG. 46, the first Hall IC 51a to the fifth Hall IC 51e are arranged radially inward than the radially outer region H. In this case, if the positive and negative poles of the detected magnetic flux of the Hall IC 51 are reversed twice or more between the first inclined magnet 71 and the second inclined magnet 72, the pole of the detected magnetic flux is reversed also at points other than the turning point of the magnetic poles of the rotor 2 like the first magnetic flux density characteristic Za to the fifth magnetic flux density characteristic Ze shown in FIG. 47. That is, in the case of FIG. 47, detection of the rotation position of the rotor 2 is difficult. However, the present embodiment shown in FIG. 48 avoids such a problem. That is, the present embodiment easily and highly accurately detects the rotation position of the rotor 2 with a simple structure. Thus, the rotating magnetic field optimal for the stator 1 is generated, and the rotation and drive of the rotor 2 is reliably controlled.

As a comparative example, the rotation position of the rotor may be detected with high accuracy using, for example, a resolver. However, the resolver has a complicated structure and is expensive. Furthermore, when using the resolver, the circumferential position of a sensor rotor, which is rotated integrally with the rotor, needs to be determined with high accuracy to detect the rotation position (angle) of the rotor with high accuracy. Also, when using a sensor magnet, which rotates integrally with the rotor, and a magnetic sensor, which detects the magnetic flux of the sensor magnet, instead of the resolver, high accuracy is required to determine the position of the sensor magnet in the circumferential direction of the rotor. That is, the same problem as the resolver arises when using the sensor magnet in addition to the first inclined magnets 71 and the second inclined magnets 72. In the present embodiment, the resolver and the additional sensor magnet are unnecessary since the magnetic flux of the first inclined magnets 71 and the second inclined magnets 72 is measured by arranging the Hall IC 51 in the radially outer region H.

(39) The radially outer region H is a region in the rotor core 8 where the magnetic flux density is high when electric power is not supplied to the embedded magnet motor. That is, the radially outer region H is the magnetic saturation region of the rotor core 8. The fastening slots 18 and the rivets 19 are arranged adjacent to and radially inward of the radially outer region H.

For example, when arranging the fastening slots 18 and the rivets 19 in the magnetic saturation region, the cogging torque and the torque ripple might be adversely affected. However, since the fastening slots 18 and the rivets 19 of the present embodiment are arranged outside the radially outer region H, the adverse affect is avoided. Furthermore, the fastening slots 18 and the rivets 19 are arranged adjacent to the radially inner end of the radially outer region H. Thus, the fastening slots 18 and the rivets 19 are arranged radially outward as much as possible, which maximizes the mechanical strength of the rotor core 8.

(40) The designing method of the embedded magnet motor, that is, the manufacturing method includes the measuring step S1 and the position determining step S2. In the measuring step S1, the Hall IC 51 for detecting rotation, which detects the magnetic flux leakage of the rotor 2 in the axial direction, is arranged to face the axial end surface 2a of the rotor 2. In the measuring step S1, while changing the radial position of the Hall IC 51, the magnetic characteristic of the rotor 2 for each radial position is measured. In the position determining step S2, the radially outer region H is determined based on the result of the measuring step S1, and the position of the Hall IC 51 is determined in the radially outer region H. The positive and negative poles of the magnetic flux detected by the magnetic sensor arranged in the radially outer region H are reversed only once during one cycle of the magnetic flux. Thus, the embedded magnet motor of the present embodiment is easily designed and manufactured.

The above embodiments may be modified as follows.

In FIG. 2, the number of the short slot 11a of each core sheet 11 does not need to be one, but may be two or more. The number of the long slots 11b of each core sheet 11 is obtained by subtracting the number of the short slots 11a from (P/2).

The short slots 11a are preferably arranged at regular intervals along the axial direction of the rotor core 8. That is, the inner restricting portions 8e are preferably distributed at regular intervals in the axial direction of the radial accommodating slots 8a. Each of the core sheets 11 may include two short slots 11a arranged next to each other in the circumferential direction, and two long slots 11b arranged next to each other in the circumferential direction. In this case, several core sheets are laminated while being rotated by 180° each. Also, several core sheets 11 may be laminated with each core sheet 11 being turned over relative to the preceding core sheet 11. In these cases, the short slots 11a, that is, the inner restricting portions 8e are distributed at regular intervals in the axial direction of the radial accommodating slots 8a.

The short slots 11a, that is, the inner restricting portions 8e may be arranged at uneven intervals in the axial direction of the radial accommodating slots 8a.

The second radial distance R2 does not need to be less than or equal to the third radial distance R3, but may be set greater than the third radial distance R3.

The first radial distance R1 does not need to be greater than the third radial distance R3, but may be set less than or equal to the third radial distance R3.

In FIG. 1A, the overlap dimension R does not need to be set to SW/2, but may be set to satisfy 0<R≦SW/4. According to the experimental result of FIG. 4, when 0<R≦SW/4 is satisfied, the magnetizing rate is substantially the maximum. Thus, inefficiency of the radial magnets 9 is further reduced.

In FIG. 2, the outer circumferential projections 8d do not need to be formed only in the short slot 11a of each core sheet 11, but may be formed in the long slots 11b. The outer circumferential projections 8d may be formed in all the preformed radial accommodating slots. That is, in FIG. 3, the outer circumferential projections 8d do not need to be arranged at some parts of each radial accommodating slot 8a along the axial direction, but may be arranged over the entire axial direction of each radial accommodating slot 8a.

Figure 8:
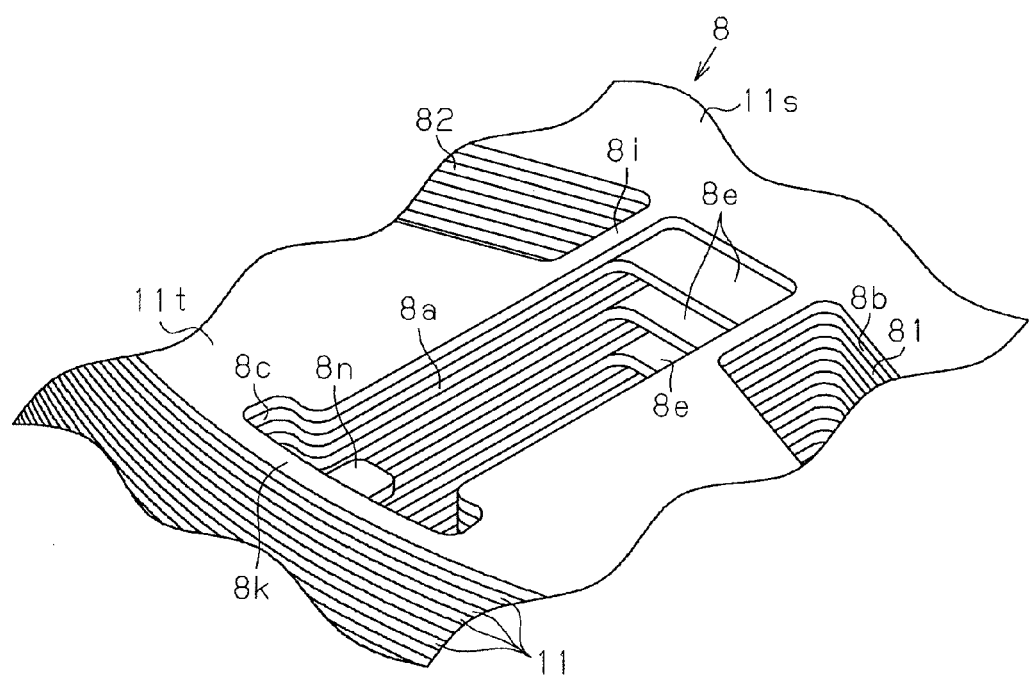
FIG. 8 is an enlarged perspective view opposite to FIG. 7, and is a perspective view looking at a radially inner section from a radially outer section.

In FIG. 8, the inward projections 8n do not need to be formed at only some parts of each radial accommodating slot 8a along the axial direction, but may be formed over the entire axial direction of each radial accommodating slot 8a.

In the core sheet 11 of FIG. 6, the inward projection 8n does not need to be arranged only in the short slot 11a, but may be arranged also in the long slots 11b.

The third width W3 of the inward projections 8n of FIG. 7 does not need to be set approximately ⅓ of the first width W1 of the radial magnets 9. The third width W3 of the inward projections 8n of FIG. 7 may take any value as long as it is less than the first width W1 of the radial magnets 9. To suppress the magnetic flux leakage via the inward projections 8n, the third width W3 of the inward projections 8n is preferably set less than or equal to ½ the first width W1 of the radial magnets 9.

In FIG. 12, the inner circumferential projection 8u does not need to be arranged only on the radial accommodating slot side surface 8p of the radial accommodating slot 8a that is in the counterclockwise direction, but may be arranged on the radial accommodating slot side surface 8p that is in the clockwise direction.

In FIG. 12, the number of the inner circumferential projection 8u formed in each core sheet 11 is not limited to one, but may be two or more. The inner circumferential projections 8u are preferably arranged at regular intervals in the axial direction of the rotor core 8. Also, when forming the inner circumferential projections 8u in the two preformed radial accommodating slots arranged next to each other in the circumferential direction, the core sheets 11 may be laminated while being rotated by 180° each, or the core sheets 11 may be laminated with each core sheet 11 being turned over relative to the preceding core sheet 11. In these cases, the inner circumferential projections 8u are located at regular intervals in the axial direction of the rotor core 8.

In FIG. 13, the inner circumferential projections 8u may be arranged at uneven intervals in the axial direction of the rotor core 8.

In FIG. 19, the number of the independent slot 11c formed in each core sheet 11 is not limited to one, but may be two or more. The number of the both-side communication slots 11d of each of the core sheet 11 is obtained by subtracting the number of the independent slots 11c from (P/2). The independent slots 11c are preferably arranged at regular intervals in the axial direction of the rotor core 8. This is because the inner bridges 8i will be arranged at regular intervals in the axial direction of the rotor core 8.

In the core sheet 11 of FIG. 19, two independent slots 11c may be arranged next to each other in the circumferential direction, and two both-side communication slots 11d may be arranged next to each other in the circumferential direction. The circumferential intervals between the independent slots 11c and between the both-side communication slots 11d are 90°. In this case, the core sheets 11 may be laminated while being rotate by 180° each, or the core sheets 11 may be laminated with each core sheet 11 being turned over relative to the preceding core sheet 11. In these cases, the independent slots 11c are arranged at regular intervals in the axial direction of the rotor core 8.

The independent slots 11c and the inner bridges 8i may be arranged at uneven intervals in the axial direction of the rotor core 8.

In the core sheet 11 of FIG. 19, the preformed radial accommodating slots do not need to be either the independent slots 11c or the both-side communication slots 11d. The preformed radial accommodating slots may be anything as long as the inner bridges 8i are formed at some parts of the rotor core 8 along the axial direction.

The core sheets 11 of FIG. 22 may be laminated such that the first one-side communication slots 11e are arranged at least at some parts of each radial accommodating slot 8a along the axial direction.

In FIG. 40B, the wide radial dimension Y of the wide slots 8c and the core sheet thickness T do not need to be set to satisfy Y=4T, but may be set to satisfy Y<4T. For example, Y may be set equal to 2T, that is, 0.8 mm.

In FIGS. 40B to 40D, the outer bridge dimension AB, the inter-inclined slot bridge dimension BB, and the inner bridge dimension CB do not need to be set to BB=0.6 mm and AB=CB=0.4 mm. That is, setting does not need to be performed to satisfy BB>AB=CB. For example, the outer bridge dimension AB, the inter-inclined slot bridge dimension BB, and the inner bridge dimension CB may be set to AB=BB=CB, that is, 0.4 mm. That is, when the outer bridge dimension AB differs from the inner bridge dimension CB, the size of the rotor 2 is increased corresponding to the greater value as apparent from FIG. 42. Thus, it is preferable to set AB equal to BB.

Figure 39:
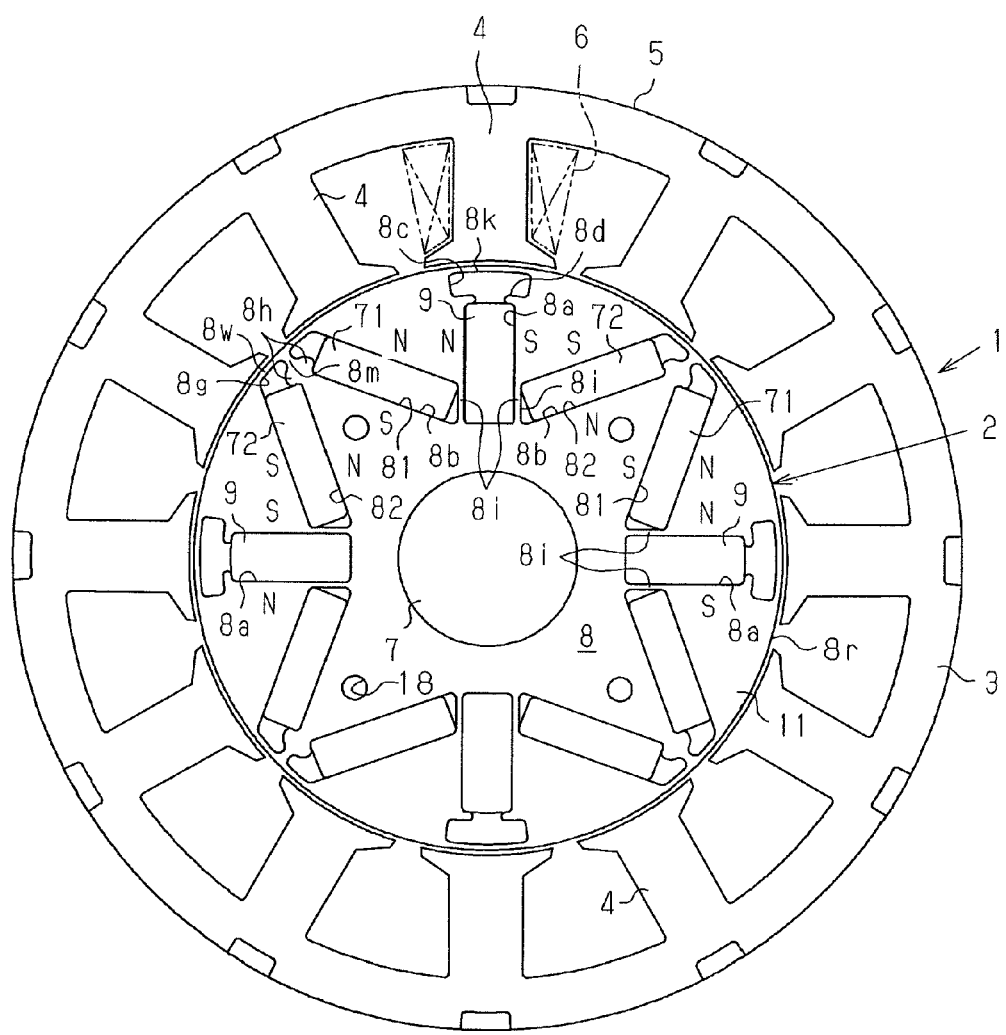
FIG. 39 is a plan view illustrating an embedded magnet motor according to a fourteenth embodiment.

In FIGS. 39 and 44, the wide slots 8c and the outer circumferential projections 8d do not need to be formed along the entire axial direction of the rotor core 8, but may be formed at some parts of the rotor core 8 along the axial direction. For example, the wide slots 8c and the outer circumferential projections 8d may be formed at both axial ends of the rotor core 8, or in every tenth core sheets 11. Also in FIG. 44, the wide slots 8c may be eliminated. The radial magnets 9 may be extended to the radially outer end of the radial accommodating slots.

In FIG. 39, the pair of outer circumferential projections 8d project from the circumferential ends of each radial accommodating slot 8a by the same projection amount. However, the outer circumferential projections 8d may project from only one circumferential side of each radial accommodating slot 8a. Also, the pair of outer circumferential projections 8d may project from both circumferential sides by different projection amounts.

In FIG. 46, the Hall IC 51 is not limited to be arranged as the seventh Hall IC 51g, but may be changed to the sixth Hall IC 51f or the eighth Hall IC 51h. The sixth Hall IC 51f is adjacent to and radially outward of the middle circle MC. That is, the sixth Hall IC 51f is located immediately radially outward of one of the fastening slots 18 and the associated rivet 19. The distance between the sixth Hall IC 51f and the narrowest line L is greater than the size of the seventh Hall IC 51g. The eighth Hall IC 51h is adjacent to and radially outward of the narrowest line L.

As shown in FIG. 48, among the sixth magnetic flux density characteristic Zf to the eighth magnetic flux density characteristic Zh, the one that has the steepest inclination around the point where the magnetic flux density becomes zero is the eighth magnetic flux density characteristic Zh. That is, the eighth Hall IC 51h accurately discriminates the changes in the magnetic poles, and is most suitable for detecting the rotation position of the rotor 2. The eighth Hall IC 51h is arranged most radially outward in the rotor 2. Thus, the eighth magnetic flux density characteristic Zh has a greater inclination than the sixth magnetic flux density characteristic Zf and the seventh magnetic flux density characteristic Zg around the point where the positive and negative poles of the magnetic flux are reversed.

In FIG. 45, the fastening slots 18 and the rivets 19 do not need to be arranged adjacent to and radially inward of the radially outer region H. The rivet 19 may be changed to other tightening member such as a bolt and a nut. The rotor core 8 does not need to be manufactured by laminating the core sheets 11. For example, the rotor core 8 may be manufactured by sintering magnetic powder. That is, the rotor core 8 may be a sintered core, and the sintered core eliminates the need for the fastening slots 18 and the rivets 19.

The measuring step S1 is not limited to measuring the first magnetic flux density characteristic Za to the eighth magnetic flux density characteristic Zh of the first Hall IC 51a to the eighth Hall IC 51h. The radially outer region H may be determined based on the center points MX of each first inclined magnet 71 and the associated second inclined magnet 72.

In FIG. 1, the V-slot outer gaps 8g do not need to be formed. The radially outer ends of the first inclined accommodating slots 81 may contact the first inclined magnets 71. Also, the radially outer ends of the second inclined accommodating slots 82 may contact the second inclined magnets 72.

In FIG. 1, each pair of the first inclined accommodating slot 81 and the second inclined accommodating slot 82 do not need to be disconnected from each other, but may communicate with each other. That is, each pair of the first inclined accommodating slot 81 and the second inclined accommodating slot 82 do not need to be independent from each other, but may communicate with each other at the radially outer end of the V-shaped accommodating slot 8b to form one slot.

In FIG. 1A, the width of the inner bridges 8i does not need to be constant along the radial direction, but may change along the radial direction. For example, in FIG. 1A, the triangular gaps 8j may be omitted.

The core sheets 11 of FIG. 2 do not need to be laminated around the rotor axis 13 while being rotated one at a time so that each of the core sheets 11 is displaced in the circumferential direction. The core sheets 11 may be laminated while rotating every set of core sheets 11 of a certain number. In this case, the number of times the core sheets 11 are rotated is reduced, which facilitates the manufacture.

The core sheets 11 forming the rotor core 8 do not need to be one type, but several types of core sheets may be used. For example, the number of the short slots 11a of each core sheet 11 may differ from one another.

In FIG. 1, the first inclined magnets 71 and the second inclined magnets 72 do not need to be substantially rectangular solid, but may be curved to form an arcuate shape, or the width may be irregular.

That is, in the V-shaped accommodating slots 8b, the straight lines that form the V-shape may be curved, or the width of the straight lines of the V-shaped accommodating slots 8b may be irregular.

The radial magnets 9, the first inclined magnets 71, the second inclined magnets 72, and the rotor core 8 of FIG. 1 do not need to be one body extending over the entire axial direction of the rotor core 8. The radial magnets 9, the first inclined magnets 71, the second inclined magnets 72, and the rotor core 8 may be divided in the axial direction. The divided members may be displaced in the circumferential direction and be laminated in the direction of the rotor axis 13. In this case, the cogging torque and the torque ripple of the embedded magnet motor are further reduced. This is because, rapid magnetic flux change between the stator 1 and the rotor 2 is further reduced.

The number of the teeth 4 and the number of the magnetic poles P of FIG. 1 may be changed. That is, the number of the radial magnets 9, the first inclined magnets 71, and the second inclined magnets 72 may be changed to other than four.

The invention claimed is:

1. An embedded magnet motor comprising a rotor,
wherein the rotor includes a rotor core, a plurality of radial magnets, a plurality of first inclined magnets and a plurality of second inclined magnets, and wherein each plurality of magnets comprises a number defined by P/2;
wherein the rotor core includes a plurality of radial accommodating slots, a plurality of first inclined accommodating slots and a plurality of second inclined accommodating slots and wherein each plurality of slots comprises a number defined by P/2, and wherein the radial accommodating slots, the first inclined accommodating slots, and the second inclined accommodating slots extend entirely through the rotor core in an axial direction,
wherein the radial accommodating slots extend substantially in a radial direction of the rotor core, and the first inclined accommodating slots and the second inclined accommodating slots extend linearly to be inclined with respect to the radial direction, wherein each pair of an inclined first accommodating slot and an associated second inclined accommodating slot form a V-shaped accommodating slot, the V-shape accommodating slot pointing radially outward of the rotor core, the radial accommodating slots and the V-shaped accommodating slots being arranged alternately in a circumferential direction of the rotor core, each of the radial accommodating slots accommodating one of the radial magnets, each of first inclined accommodating slots accommodating one of first inclined magnets, and each of the second inclined accommodating slots accommodating one of the second inclined magnets, wherein each of the radial magnets is located between one of the first inclined magnets and one of the second inclined magnets, wherein each radial magnet and a circumferentially adjacent first inclined magnet form one of a north pole and a south pole, and each radial magnet and a circumferentially adjacent second inclined magnet form the other one of the north pole and the south pole, and as a result, a plurality of north poles and a plurality of south poles are formed and wherein each plurality of poles comprises a number defined by P/2, and wherein P comprises a number of magnetic poles of the rotor, wherein a direction perpendicular to the direction in which each radial accommodating slot extends as viewed from the axial direction is referred to as a width direction, and wherein the embedded magnet motor includes a magnetic sensor, and the magnetic sensor detects rotation of the rotor by detecting axial magnetic flux leakage from the rotor, and wherein the magnetic sensor is arranged in a radially outer region to face an axial end surface of the rotor, the magnetic sensor in the radially outer region detects the magnetic flux, and positive and negative poles of the magnetic flux are reversed only once in one cycle of magnetic flux variation during a period when the rotor is rotated and the magnetic sensor passes between the first inclined magnet and the second inclined magnet, wherein the radially outer region is a magnetic saturation region of the rotor between one of the first inclined magnets and the associated second inclined magnet when electricity is not supplied to the embedded magnet motor.

2. The embedded magnet motor according to claim 1,
wherein the rotor core is formed by laminating a plurality of core sheets in the axial direction and wherein each core sheet includes a fastening slot that extends through the axial direction, the core sheets being secured by a fastening member that is inserted within the fastening slot and wherein the fastening slot and the fastening member are positioned adjacent the radially outer region.

3. The embedded magnet motor according to claim 1,
wherein the surfaces of each first inclined magnet and the associated second inclined magnet that face each other are referred to as inclined magnet surfaces, and a center of each inclined magnet surface is referred to as a center point, and
wherein the radially outer region is located radially outward of the center points.

* * * * *